United States Patent [19]
Tsuzuku et al.

[11] Patent Number: 5,758,612
[45] Date of Patent: Jun. 2, 1998

[54] VALVE ACTUATING STRUCTURE FOR MULTI-VALVE ENGINE

[75] Inventors: Hiroyuki Tsuzuku; Tetsushi Saito; Naoki Tsuchida, all of Iwata, Japan

[73] Assignee: Yamaha Hatsudoki Kabushiki Kaisha, Iwata, Japan

[21] Appl. No.: 885,453

[22] Filed: Jun. 30, 1997

Related U.S. Application Data

[63] Continuation of Ser. No. 521,055, Aug. 29, 1995, abandoned.

[30] Foreign Application Priority Data

| Aug. 31, 1994 | [JP] | Japan | 6-207088 |
| Aug. 31, 1994 | [JP] | Japan | 6-207089 |
| Aug. 31, 1994 | [JP] | Japan | 6-207090 |
| Aug. 31, 1994 | [JP] | Japan | 6-207091 |

[51] Int. Cl.$^6$ .................. F02B 29/00; F01L 13/00
[52] U.S. Cl. .................. 123/90.16; 123/198 F
[58] Field of Search .............. 123/90.12, 90.15, 123/90.16, 90.27, 90.48, 198 F, 308, 432; 251/251

[56] References Cited

U.S. PATENT DOCUMENTS

| 4,667,636 | 5/1987 | Oishi et al. | 123/432 |
| 4,703,729 | 11/1987 | Sakano et al. | 123/308 |
| 4,770,137 | 9/1988 | Okabe et al. | 123/198 F |
| 4,911,113 | 3/1990 | Yamada | 123/90.27 |
| 5,111,791 | 5/1992 | Onodera | 123/90.27 |
| 5,247,913 | 9/1993 | Manolis | 123/90.16 |
| 5,343,833 | 9/1994 | Shirai | 123/90.16 |
| 5,361,734 | 11/1994 | Shirai | 123/198 F |
| 5,431,133 | 7/1995 | Spath et al. | 123/90.16 |
| 5,488,934 | 2/1996 | Shirai et al. | 123/90.16 |
| 5,555,861 | 9/1996 | Mayr et al. | 123/90.16 |

FOREIGN PATENT DOCUMENTS

| 0615058 | 9/1994 | European Pat. Off. |
| 0668436 | 8/1995 | European Pat. Off. |
| 2512493 | 3/1983 | France. |
| 3600408 | 7/1987 | Germany. |
| 4108469 | 9/1991 | Germany. |

OTHER PUBLICATIONS

Patent Abstracts of Japan, vol. 015 No. 363 (M–1165) & JP-A-03 160113 Oct. 1991.
Patent Abstracts of Japan, vol. 010 No. 304 (M–526) & JP-A-61 118518 Jun. 1986.
Patent Abstracts of Japan, vol. 009 No. 311 (M–436) & JP-A-60 145419 Jul. 1985.

*Primary Examiner*—Weilun Lo
*Attorney, Agent, or Firm*—Knobbe, Martens, Olson & Bear LLP

[57] ABSTRACT

A number of embodiments of multiple-valve internal combustion engines having at least some of the valves being deactivatable by means of a hydraulic tappet assembly so as to control the flow path and flow pattern into and out of the combustion chamber. A hydraulic system is provided for controlling which of the valves operate and, if desired, the lift of the valves.

35 Claims, 24 Drawing Sheets

$D_{IS1} = D_{IS2} > D_{C1} = D_{C2} > D_{IC}$ $D_{IS1} = D_{IS2} > D_{C1} = D_{C2} > D_{IC}$ 5,758,612

VALVE ACTUATING STRUCTURE FOR MULTI-VALVE ENGINE

This application is a continuation of U.S. patent application Ser. No. 08/521055, filed Aug. 29, 1995, now abandoned.

BACKGROUND OF THE INVENTION

This invention relates to a valve actuating structure and more particularly to an improved valve actuating structure particularly useful with multi-valve internal combustion engines.

As is well known, the desired performance of the induction system of an internal combustion engine is dependent upon the actual running conditions of the engine. At low speeds and low loads the intake charge should enter the combustion chamber at a relatively high velocity and in a way so as to generate turbulence in the combustion chamber. Intake passages and induction systems that provide such type of charge forming generally are small in cross-sectional area and may have sharp bends in them so as to redirect the charge to increase the turbulence. Obviously these devices restrict the capacity of the engine to induct charge at higher speeds and higher loads.

When operating at mid-range performance, some turbulence may still be desirable and some increase in velocity also may be helpful. In fact, however, it frequently is the case for a given engine design that the preferred mixture flow into the combustion chamber to achieve optimum performance at mid-range will be quite different than that at the lower ranges.

At high-speed/high-load conditions, it is generally desirable to have the charge enter the combustion chamber in a substantially unrestricted fashion so as to permit maximum charging efficiency and high performance. Frequently little or no turbulence is required or desirable in the combustion chamber under this condition. It has been realized however, that a small tumble motion may be useful even under this running condition.

Therefore, it should be obvious that the induction system must provide different charging characteristics at different load and speed ranges. A wide variety of systems have been proposed in an attempt to meet these varying conditions. All of these systems, however, generally have some areas where improvement is possible.

It is, therefore, a principal object of this invention to provide an improved induction system for an engine.

It has also been acknowledged that the performance of an engine can be substantially improved by using a greater number of intake valves that individually have smaller effective cross-sectional areas than a single large intake valve. The multiple valves provide a larger total effective flow area with lower inertia effects than a single large intake valve. However, where multiple intake valves are employed, their positioning relative to the combustion chamber varies and the effect of the charge entering the combustion chamber through each valve may be different from the others. In fact, in some instances and under some running conditions the flow from one intake passage may interfere with the flow from another intake passage.

It has been acknowledged that by operating only some of the intake valves under some running conditions, the engine performance can be actually increased. In fact, the selective valve actuation depending upon the running characteristics can further assist in providing the desired type of motion and velocity in the combustion chamber depending upon the engine load Therefore, there has been proposed a system as disclosed in the co-pending application of Hiroyuki Tsuzuku, entitled "Induction Control System For Multi-Valve Engine," Ser. No. 08/504,256, filed Jul. 19, 1995 and assigned to the assignee hereof. Shown in the several embodiments of that application are multiple valve engines wherein the individual intake valves may be selectively actuated or disabled. This invention relates to an improvement in engines of that type.

If one or more valves is selectively disabled, there obviously must be a mechanism provided that will cause the opening and closing of the valve when desired and the disabling of it at other times. Such a mechanism must be capable of operating and making changes in valve actuation during engine running with a high response time and a high reliability.

It is, therefore, a further principal object of this invention to provide an improved simplified and highly effective selective valve operating mechanism.

As should be readily apparent, the charging efficiency of the engine can be improved through the use of overhead valves. In addition, performance can further be increased if these valves are directly actuated. The provision of a disabling mechanism for such directly actuated valves, however, presents substantial difficulties.

It is, therefore, a still further object of this invention to provide an improved selective valve actuating mechanism for a directly operated overhead valve engine.

It is a still further object of this invention to provide a direct valve actuating tappet that includes a disabling mechanism within the tappet itself.

In many instances it is also desirable that the valve not only be actuated or disabled, but also that the actual lift of the valve changed. That is, under some running conditions, it may be desirable that the valve provides full flow. Under other running conditions, however, it may be that the valve should provide no flow. In other conditions partial flow through the valve may be desirable. To achieve not only enabling and disenabling, but also variable lift, presents substantial difficulties with the prior art types of constructions.

It is, therefore, a still further object of this invention to provide a direct valve actuator which permits variations in actual valve lift and/or total disabling of the valve, if desired.

It is a further object of the invention to provide a direct valve actuating tappet that has these capabilities.

As is well known, the more complex the cylinder head assembly becomes, the more expensive it is to manufacture and the more costly the total engine becomes. Thus, where the engine employs multiple valves and multiple camshafts for actuating it, the cylinder head construction becomes quite complex. To add further the provision of a valve actuator that permits variations in the valve lift further complicates the cylinder head construction. Obviously the added components and their function and support adds to the cost and difficulty of casting and machining.

It is, therefore, a still further object of this invention to provide an improved and simplified cylinder head assembly for a multiple valve, selectively operable valve actuating system for an internal combustion engine.

In addition to the difficulties aforenoted, there also is present the problem of providing the operating mechanism for controlling the valve lift. That is, the variable or selective valve lift mechanism requires both mechanical hardware and also a control arrangement for controlling the variable lift mechanism. One particularly useful system employs hydraulics for controlling the valve lift. Again, this presents substantial difficulties in insuring the necessary flow paths and control circuits for this effect. This problem becomes particularly acute as the number of valves that are selectively controlled increases.

It is, therefore, a still further object of this invention to provide an improved and simplified hydraulic valve actuating mechanism for an engine.

SUMMARY OF THE INVENTION

A first feature of this invention is adapted to be embodied in a valve operating mechanism for a reciprocating machine. The machine has a flow path with a valve seat at one end thereof. A poppet-type valve has a head portion co-operable with the valve seat for controlling the flow therethrough and a stem portion that is supported for reciprocation about a valve axis for opening and closing of the valve seat. A cam cooperates with a tappet body that is reciprocal about an axis that is parallel to the valve axis. A valve actuating element is associated with the tappet body and is engageable with the valve stem for controlling the position of the valve stem. Means are provided for selectively coupling the tappet body and the valve actuating element for simultaneous movement for controlling the position of the valve by the position of the tappet body.

Another feature of the invention is adapted to be embodied in an overhead valve internal combustion engine that is comprised of a cylinder head having a surface co-operable with a cylinder block for forming at least in part a combustion chamber. A plurality of flow passages extend through the cylinder head surface for flow to and from the combustion chamber. A plurality of poppet-type valves have stem portions slidably supported in the cylinder head for controlling the flow through the flow passages. A carrier member is detachably affixed to the cylinder head and has a plurality of bores receiving respective tappet bodies associated with the stems of the valves. A camshaft is journaled by the carrier member and associated with the tappet bodies for operating the tappet bodies. A plurality of valve actuating plungers are associated with the tappet bodies and the valve stems. Hydraulically operated means are interposed between at least some of the tappet bodies and the valve actuating plungers for providing a detachable interconnection for effecting movement of the plungers along with the tappet bodies for controlling the valves. A hydraulic supply circuit is provided for supplying hydraulic pressure to the hydraulically operated means for effecting connection and disconnection between the tappet bodies and the actuating plungers.

A further feature of the invention is adapted to be embodied in a hydraulic system for an internal combustion engine having a cylinder block assembly having at least one cylinder bore. A piston reciprocates in the cylinder bore and drives a crankshaft that is journaled within the cylinder block assembly. A cylinder head assembly is affixed to the cylinder block assembly and closes the cylinder bore to form at least one combustion chamber. Intake and exhaust passages are formed in the cylinder head assembly for delivering a charge to the combustion chamber and discharging a burnt charge from the combustion chamber. Valves are supported in the cylinder head assembly for controlling the flow through the intake and exhaust passages. At least one overhead camshaft is supported in the cylinder head assembly for operating at least some of the valves. At least one of the valves is selectively operated through the camshaft by hydraulic coupling means for opening and closing the one valve or disabling its operation. A hydraulic pump is driven by the crankshaft. Hydraulic passages are formed in the cylinder block assembly and in the cylinder head assembly for delivering hydraulic fluid to the hydraulic coupling means for selectively actuating or de-actuating it. A control valve is supported in the cylinder head assembly for controlling the communication of the hydraulic passage with the hydraulic coupling means for selectively actuating or de-actuating the hydraulic coupling means.

DETAILED DESCRIPTION OF THE PREFERRED EMBODIMENTS OF THE INVENTION

Figure 1:
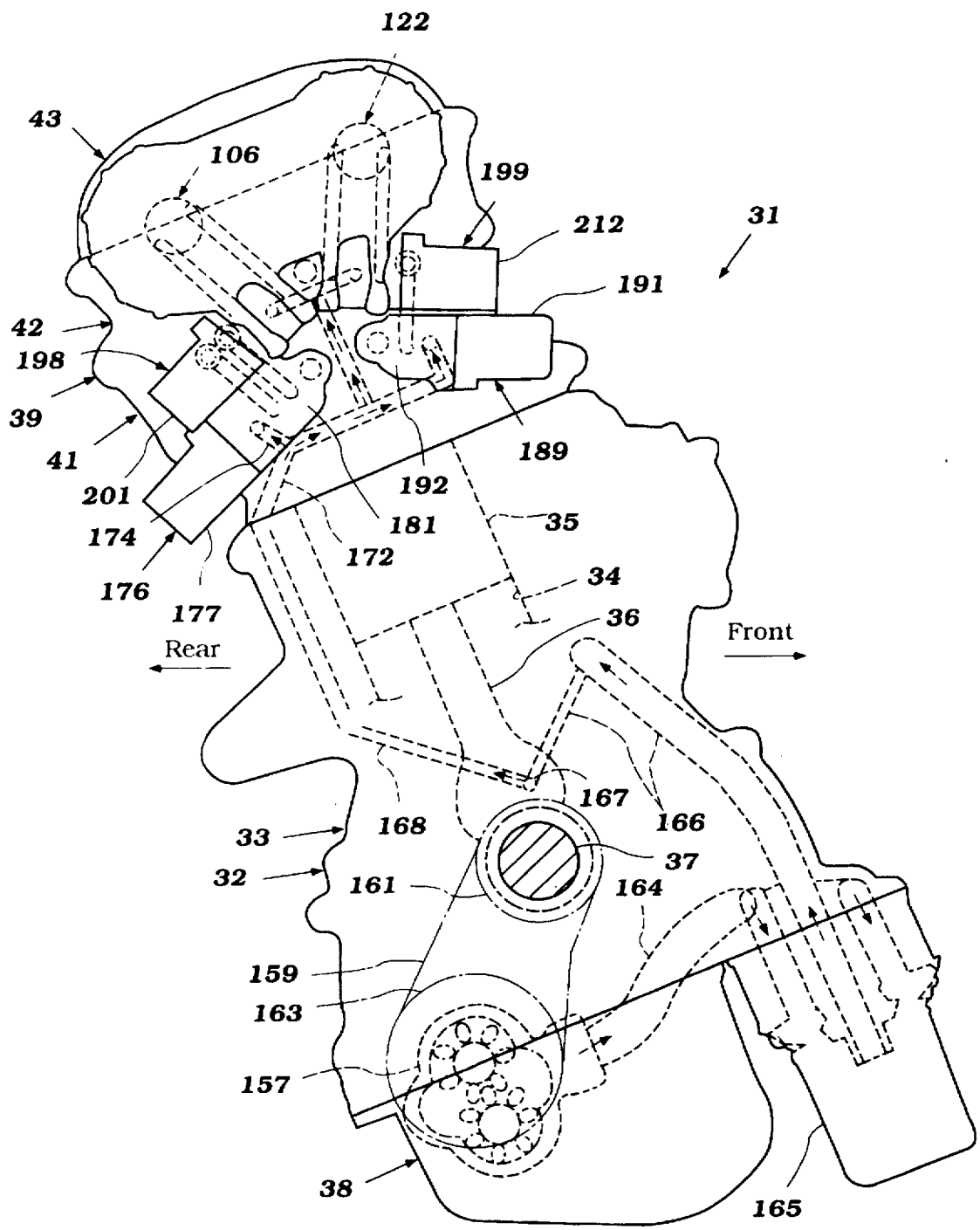
FIG. 1 is a front elevational view of an internal combustion engine constructed and operated in accordance with a first embodiment of the invention.

Referring now in detail to the drawings and first to the embodiment of FIGS. 1–16 and initially to FIG. 1, an internal combustion engine constructed in accordance with this embodiment of the invention is shown in front elevational view and is identified generally by the reference numeral 31. Although FIG. 1 is referred to as a front elevational view of the engine 31, the engine 31 is, in the depicted embodiment, designed for automotive application. Therefore, the engine 31 is disposed within the engine compartment so that it extends transversely to the longitudinal center line of the vehicle with the front and rear of the vehicle being shown by the arrows in this figure. Hence, although the view is a front elevational view of the engine 31, it actually shows the side of the engine in the manner in which it is oriented in the engine compartment. However, the invention has applicability to a wide variety of applications for internal combustion engines and, therefore, the normal front, rear, side orientations will be applied when describing the engine.

The automotive application for the engine is described because the invention has particular utility and engines that are designed to operate over widely varying speed and load ranges. Automotive applications are typical environments where these running conditions are encountered. It will be apparent to those skilled in the art, however, how the invention may be applied with other applications for engines.

The engine 31 is comprised of a cylinder block, indicated generally by the reference numeral 32, which is block is covered from view in FIG. 1 by a front cover 33 that is affixed to the cylinder block 32 in a manner which is known in the art.

The cylinder block 32 is provided with a plurality of cylinder bores 34 which may be formed directly in the cylinder block or by liners positioned therein. In the illustrated embodiment, the engine 31 is depicted as being an in-line type of 4-cylinder engine and hence the cylinder block 32 has four cylinder bores 34. It will be readily apparent to those skilled in the art, however, how the invention may be practiced with engines having other cylinder numbers and other configurations.

A piston 35 is supported for reciprocation in each cylinder bore 34. The pistons 35 are connected by means of piston pins (not shown) to the upper or small ends of connecting rods 36. The lower or large ends of the connecting rods 36 are split and are journaled on the throws of a crankshaft, indicated by the reference numeral 37.

The crankshaft 37 is rotatably journaled in any manner known in this art within a crankcase chamber formed by the skirt of the cylinder block 33 and a crankcase member 38 that is affixed thereto in a manner known in the art. Except for general relationship to the lubricating system of the engine, the invention deals primarily with the cylinder head assembly and valve mechanism associated therewith. Therefore, components of the engine which are conventional either are not illustrated or are illustrated only schematically or partially. Where any detailed construction of a component of the engine 31 is omitted or not fully described, it will be apparent to those skilled in the art how any conventional structure may be employed to practice the invention.

A cylinder head assembly, indicated generally by the reference numeral 39, is affixed to the cylinder block 32 in a manner which will be described. The cylinder head assembly 39 includes a main cylinder head casting 41, a front timing cover 42, and a cam cover 43 that is affixed to the cylinder head casting 41 in a manner which will be described. The cylinder head assembly 39 also includes a number of additional elements, which will now be described by particular reference to FIGS. 2–8 with initial emphasis on FIGS. 2–5.

The cylinder head casting 41 is provided with a plurality of recesses 44 formed in the lower surface thereof which recesses cooperate with the cylinder bores 34 and the heads of the pistons 35 to define the combustion chambers of the engine. At times the recesses 44 will be referred to as the combustion chambers since, at top dead center position of the piston 35, the volume of the combustion chamber is defined primarily by the recess 44. The recess 44 and the head of the piston 35 is configured preferably to form a combustion chamber which, at top dead center, has a generally lens-like configuration.

Each cylinder head recess 44 is surrounded by a sealing surface 45 of the cylinder head casting 42 that is adapted to be brought into sealing engagement with the upper deck of the cylinder block 32 and an interposed gasket 46. Threaded fasteners 47 (FIG. 5) are provided for this purpose. It will be noted that the threaded fasteners 47 are disposed so that they are substantially equal distance from the axis of the cylinder bore, indicated by the line A in some of the figures. The cylinder head casting 41 is provided with a tapped opening that receives a spark plug 48 that has its gap 49 disposed substantially on this axis A.

An intake charge is delivered to the combustion chambers 44 through an intake passage, indicated generally by the reference numeral 51, which has an inlet opening 52 formed in an outer surface 53 of the cylinder head casting 42. An intake manifold 54 is provided which has individual runner sections that cooperate with the cylinder head intake passage openings 52 for delivering at least an air charge thereto. This intake manifold is not shown in total detail because, like many other components of the engine, any known structure may be employed for supplying the charge to the cylinder head intake passages 51.

Figure 5:
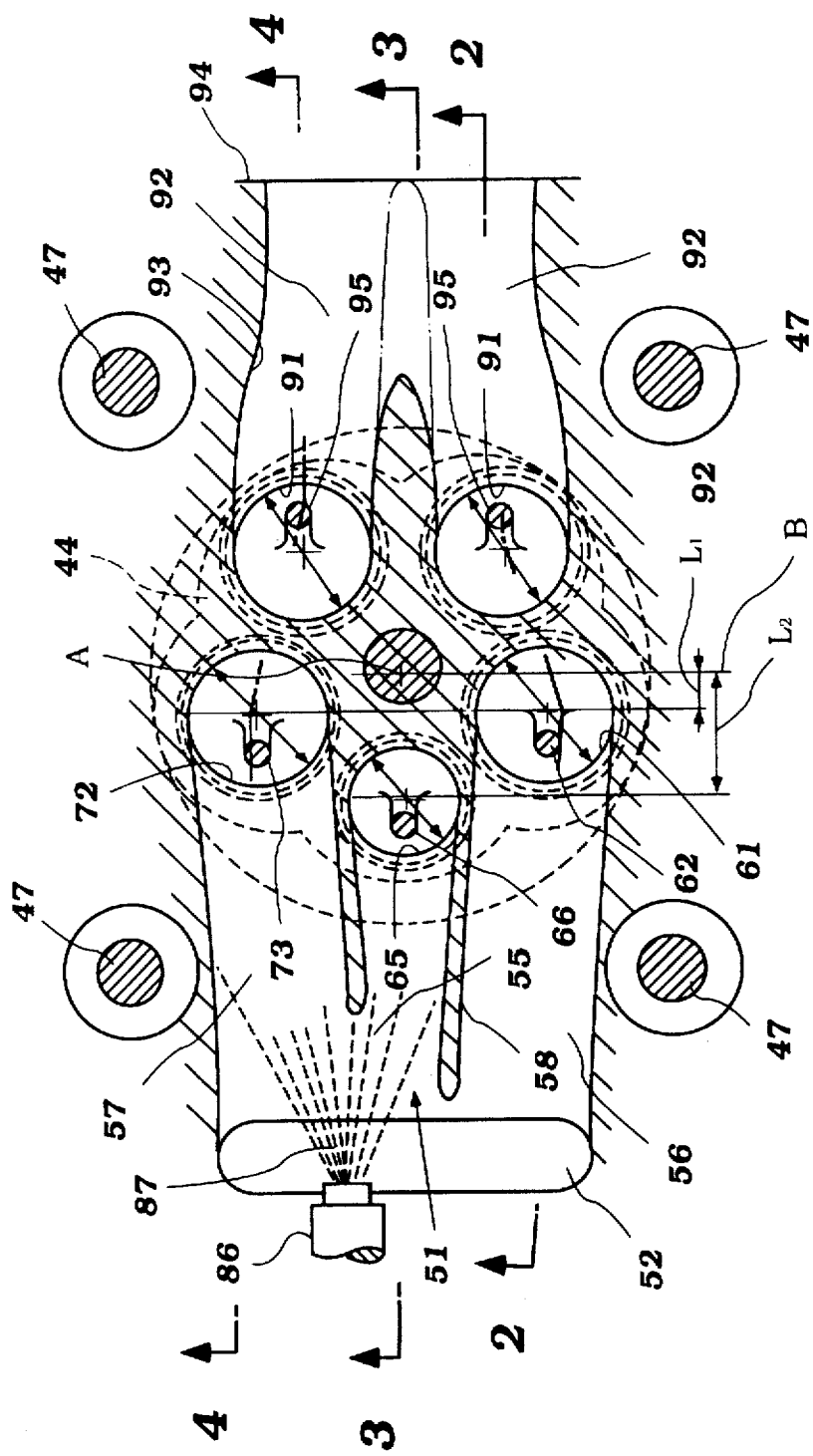
FIG. 5 is a cross-sectional view taken through a generally horizontally extending plane passing through the intake and exhaust passages of the engine of this embodiment.

As may be best seen in FIG. 5, the cylinder head intake passage 51 is divided into three intake passage portions comprised of a center intake passage portion 55 and a pair of side intake passage portions 56 and 57. A first dividing wall 58 separates the center intake passage portion 55 from the first side intake passage portion 56. In this embodiment, this wall 58 extends substantially outwardly to a position closely adjacent the inlet opening 52. This construction appears best in FIGS. 2 and 5.

At a point adjacent the combustion chamber recess 44, the side intake passage 56 has a downwardly curved portion 59 which terminates in a side valve seat 61 that is formed in the cylinder head casting 41. This valve seat 61, like the other valve seats which will be described, may be formed by a pressed or cast-in insert or in any other manner known in this art.

A first side poppet-type intake valve, indicated generally by the reference numeral 62, is slidably supported in the cylinder head casting 41 in a manner which will be described and has its head portion 63 cooperating with the valve seat 61 for opening and closing it in a manner which will also be described.

It should be noted as seen in FIG. 5 that the intake valve seat 61 is disposed so that its center lies at a distance $L_1$, from a plane B containing the cylinder bore axis A and extending parallel to and/or including the axis of rotation of the crankshaft 37. Hence, a portion of the side intake valve seat 41 extends over this plane. The diameter of the valve seat 61 is indicated at $D_{is}1$.

Referring now to the center intake passage portion 51, it also has a downwardly curved portion 64 which is curved more abruptly than the side portion 59 and which terminates at a center valve seat 65. This valve seat 65 has a diameter $D_{ic}$ which is substantially greater than the diameter $D_{is}1$ of the side intake valve seat 61. In addition, the center of the center valve seat 65 is disposed at a distance $L_2$ from the plane B which is substantially greater than the plane $L_1$.

A poppet-type center intake valve, indicated generally by the reference numeral 66, has a head portion 67 that cooperates with the center intake valve seat 61 so as to control the flow therethrough. This center intake valve 66 is supported in the cylinder head casting 41 for reciprocation in a manner which will be described.

The center intake passage portion 55 is separated form the remaining second side intake passage portion 57 by a dividing wall 68. It should be noted that, in this embodiment, the wall 68 extends a lesser distance into the intake passage 51 and terminates at a side edge 69 which is disposed closer to the center intake valve seat 65 than the side wall 58 dividing the first intake passage portion 56 from the center intake passage portion 55.

Figure 4:
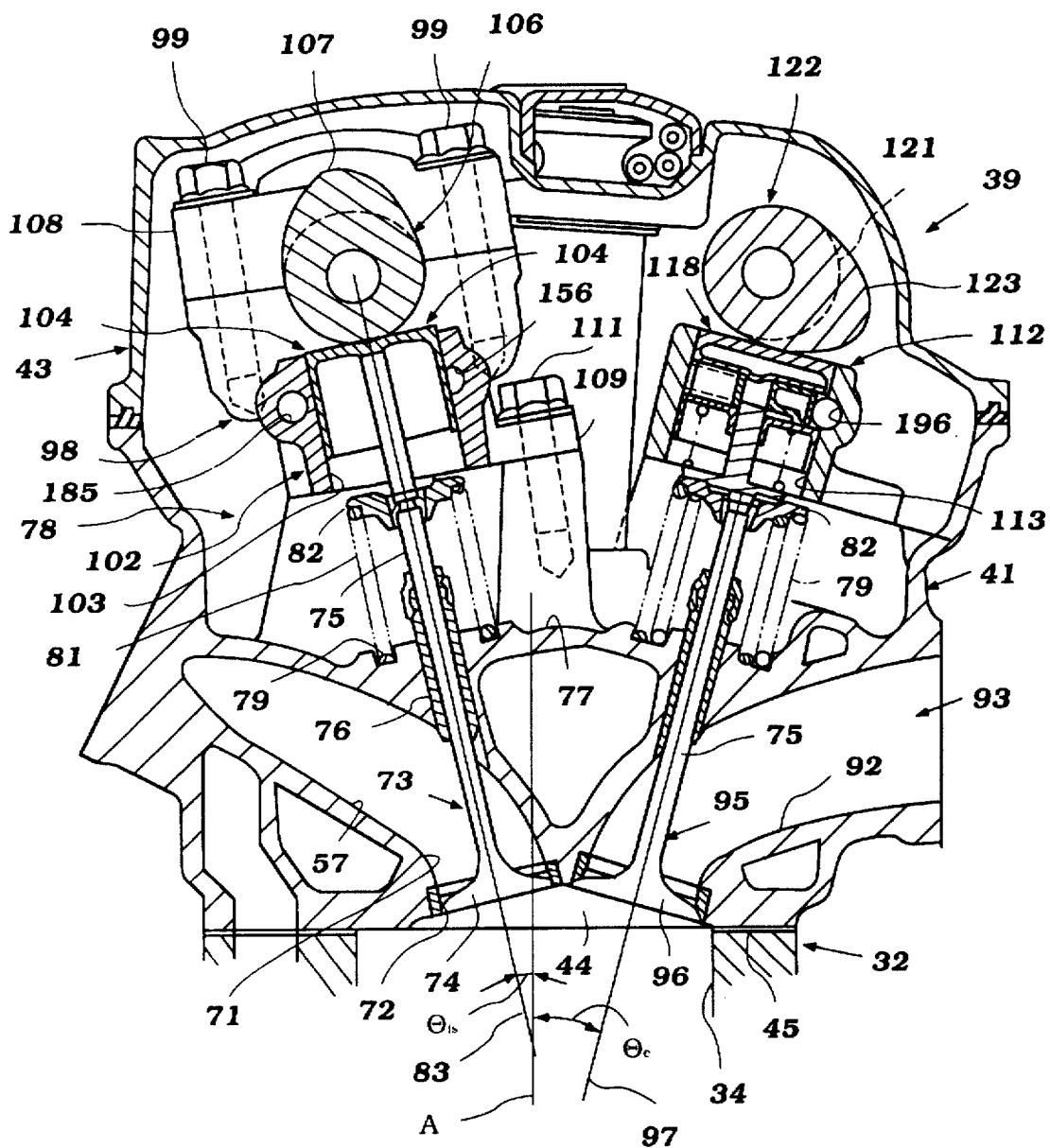
FIG. 4 is an enlarged cross-sectional view taken along the line 4—4 of FIG. 5.

This remaining side intake passage portion 57 is shown in FIG. 4 and like the other intake passages has a curve 71 that terminates at a respective side valve seat 72. In this embodiment, the center of the side valve seat 72 lies at the same distance $L_1$ from the plane B containing the cylinder bore axis A as the first side intake valve seat 61. In addition, it has a diameter $D_{is}2$ equal to the diameter $D_{is}1$ of the first intake side intake valve seat 61. As will be described in conjunction with later embodiments, these diametric relations and spacial locations can be varied.

A second side intake valve, indicated generally by the reference numeral 73, is supported for reciprocation in the cylinder head casting 41 also in a manner which will be described and controls the flow through the remaining side intake valve seat 72. This valve has a head 74 that cooperates with the valve seat 72 in a known manner.

The manner of reciprocal support for the intake valves 62, 66 and 73 will now be described. Although the orientation of these valves is different, as will become apparent, the manner of support for each valve is the same and, therefore, the stems and supporting mechanism for each valve will be described by the same reference numerals.

Each valve has a stem portion 75 that is supported for reciprocation within a respective valve guide 76 that is cast or pressed into the cylinder head casting 42 in any known manner. The cylinder head casting 42 has an upper surface 77 that is formed in a cam chamber 78 thereof. This cam chamber 78 is closed by the cam cover 43.

The area around each of the valve guides 77 is machined, as at 79, so as to provide a seat for a spring 81. These valve springs 81 each are connected to the upper ends of the valve stems 75 by keeper retainer assemblies 82 in a manner which is well known in this art.

In this embodiment, the valve guides 76 associated with the side intake valves 62 and 63 define respective parallel axes 83 which lie in a common plane that is disposed at an acute angle to the plane B containing the cylinder bore axis A. This acute angle is indicated by the dimension $\theta_{is}$ in the figures. The reciprocal axis of the center intake valve 66 defined by its valve guide 77 is indicated at 85 in FIG. 3 and is disposed also at an acute angle to the plane B containing the cylinder bore axis A. This acute angle $\theta_{ic}$ is, however, substantially less than the angle $\theta_{is}$. This angular relationship provides for a generally compact combustion chamber configuration of the aforenoted lens shape and provides a high compression ratio and low surface areas, a problem with 5-valve-per-cylinder engines. The mechanism for actuating the intake valve 62, 66 and 73 will be described later.

Although various types of charge formers may be employed, in the preferred embodiments, electronically operated fuel injectors, indicated generally by the reference numerals 86, are provided. These fuel injectors 86 have nozzle portions 87 that are mounted in pockets 88 formed in the intake manifold 54 and have, in this embodiment, a spray axis, indicated by the line 89 in FIG. 5. This spray axis is disposed also at an acute angle to the plane B containing the cylinder bore axis A, but this acute angle is greater than the acute angles $\theta_{ic}$ and $\theta_{is}$ of the center and side intake valves.

Figure 9:
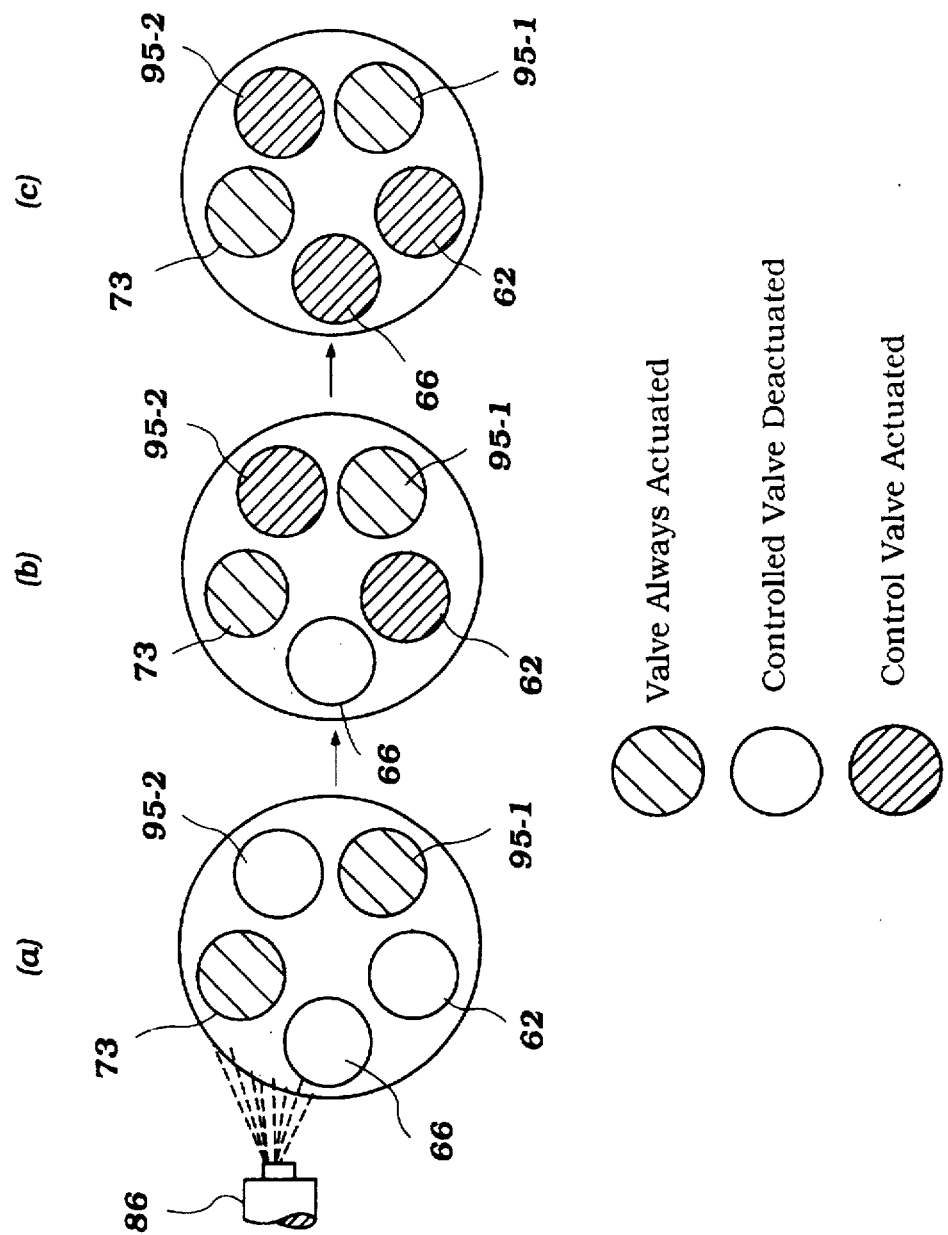
FIG. 9 is a partially schematic view showing three running conditions, low speed/low load (a), mid-range (b), and high speed/high load (c). The legend in this figure and other later and similar figures indicates the various valve actuating conditions.

As may also be seen in FIGS. 5 and 9, the fuel injector nozzle 87 is offset from the center of the intake passage opening 51 and is generally aligned with the wall 68 that divides the center intake passage portion 55 with the side intake passage portion 57. Hence, the fuel sprayed from the nozzle 87 as shown in FIG. 5 and in figures of this embodiment to be described later, will pass primarily toward the side intake valve seat 72 and the center intake valve seat 65.

The charge thus formed by the fuel injectors 86 and the induction system is admitted to the combustion chambers 44 in a manner which will also be described later depending upon the actual running condition. This charge is fired by the spark plug 48 in a known manner and then is discharged through the exhaust system, which will now be described.

The exhaust system includes a pair of exhaust valve seats 91 that are disposed in the combustion chamber recess 44 of the cylinder head 42 on the side of the plane B containing the cylinder bore axis A opposite to the center intake valve seat 65 and the major portions of the side intake valve seats 61 and 72. In this embodiment, the diameter of each of the exhaust valve seats 91 $D_{e1}$ and $De_{e2}$ are equal. The exhaust valve seats 91 are formed at the inlet ends of a Siamese-type exhaust passage 92 that extends from the respective valve seats 91 to a discharge end 93 formed in an outer surface 94 of the cylinder head casting 41. The surface 94 lies generally on the opposite side of the cylinder head from the inlet surface 53. An exhaust manifold (not shown) collects the exhaust gases from the exhaust passage openings 93 and delivers them to the atmosphere through an exhaust system of any known type.

The exhaust valves 95 have head portions 96 that cooperate with the exhaust valve seats 91 so as to control the flow therethrough.

The exhaust valves 95 are reciprocally supported in the cylinder head casting 41 and urged to their closed positions by means of an arrangement including their stems, valve guides, coil compression springs, and valve keepers, which have the same general construction as on the intake side of the engine. Therefore, these components have been identified by the same reference numerals and will not be described again because of their generally conventional construction. However, it should be noted that the diameters DIE of the valve seats 91 and accordingly the corresponding diameters of the valve heads 96 are larger than that of the diameters of the side intake valve seats 61 and 72 and smaller than the diameter of the center intake valve seat 65. In other words, the following relationship applies:

$$D_{ic} > D_{e1} = D_{e2} > D_{is1} = D_{is2}$$

Figure 2:
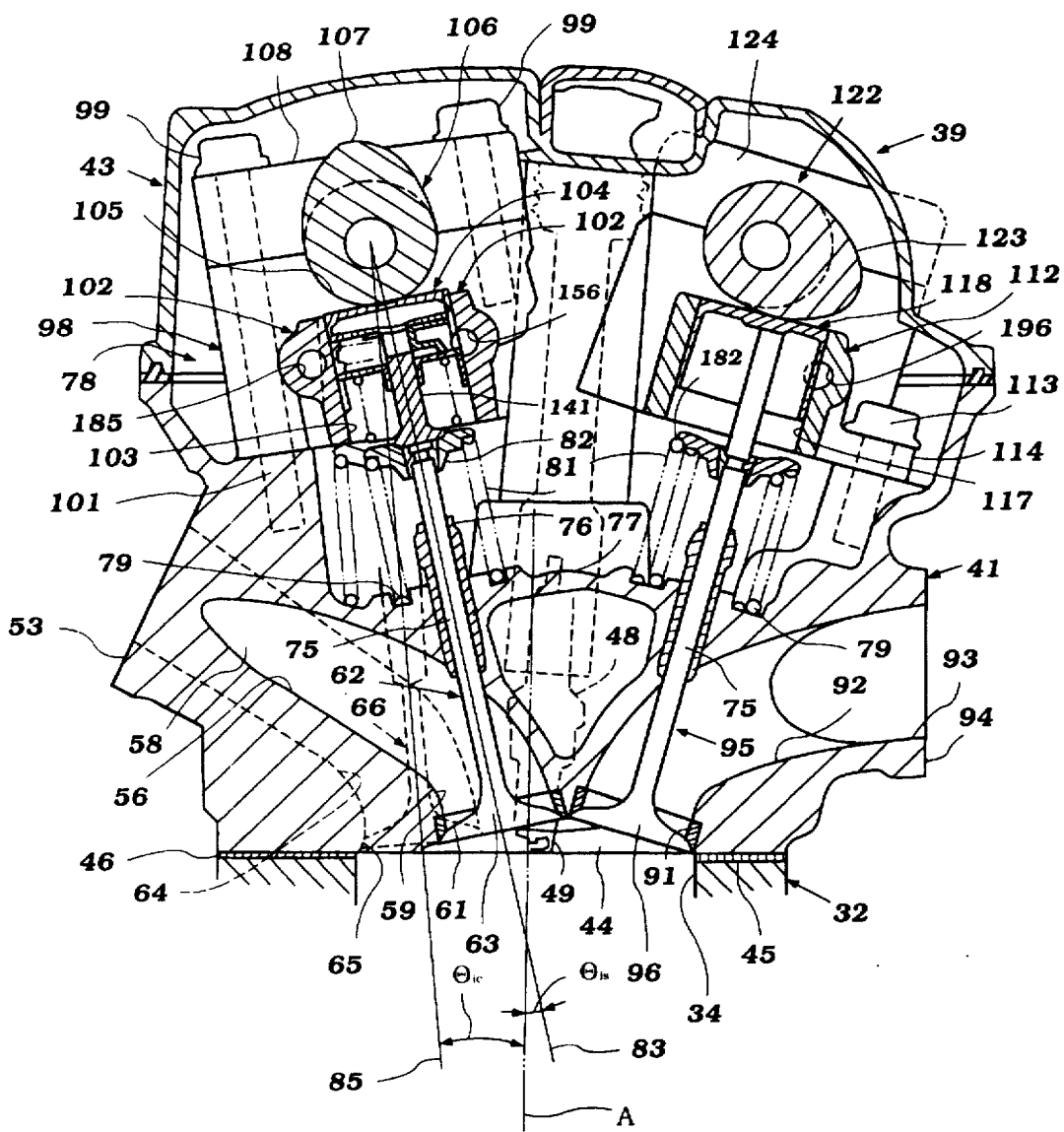
FIG. 2 is an enlarged cross-sectional view of a portion of the engine and is taken generally along the line 2—2 of FIG. 5.

Because of this larger diameter, it may be desirable to provide dual coil springs for these larger valves and FIG. 2 shows the use of dual springs in conjunction with the exhaust valves 95.

As may be best seen in FIG. 4, the axis of reciprocation of the exhaust valves 95, which axis is indicated by the reference numeral 97, is disposed at an acute angle $\theta_e$ to the plane B containing the cylinder bore axis A. This acute angle $\theta_e$ is greater than the acute angle $\theta_{ic}$ of the center intake valve and either equal to or greater than the acute angle $\theta_{is}$ of the side intake valves.

The mechanism for actuating the valves comprised of the intake valves 62, 66 and 73, and the exhaust valves 95 will now be described. Initially, the construction for operating the intake valve 62, 66 and 73 will be described and the construction associated therewith appears best in FIGS. 2–4, 6 and 7.

In order to facilitate and simplify the construction of the cylinder head casting 41, which is particularly important because of the multiple valve arrangement and the fact which permits certain of the valves to be deactivated as will be described, an intake cam carrier, indicated generally by the reference numeral 98, is positioned within the cam chamber 78 on the intake side of the cylinder head casting 41. This cam carrier 98 is affixed in place by means that include threaded fasteners 99. The threaded fasteners 99 pass through the cam carrier 98 and are fixed into the cylinder head casting 41 and specifically to bosses 101 formed thereon at spaced positions along its length.

Adjacent each cylinder of the engine, the cam carrier 98 is formed with a bridge section 102 in which three tappet receiving bores 103 are formed. The tappet receiving bores 103 are disposed at angular relationships which are complimentary to those of the stems 75 of the respective valves which they operate. These bores 103 receive valve actuating tappet assemblies, which are indicated generally by the reference numeral 104, but which differ, in some extent, for each valve. That is, certain of the tappet assemblies 104 are provided with a structure whereby the individual valves associated with them may be deactivated so they will not open and close. Alternatively, the construction permits opening and closing of the associated valve at a two different lifts which are determined, in a manner to be described. The tappet assemblies 104 will be described more in detail later by reference to FIGS. 10–15.

In the area between pairs of the tappet receiving bores 103 and at spaced locations along the length of the engine, the cam carrier member 98 is provided with camshaft bearing portions 105. These surfaces are formed integrally in the carrier member upper surface and generally have the shape of a segment of a cylinder. Journaled therein is an intake camshaft, indicated generally by the reference numeral 106.

The intake camshaft 106 has at spaced locations along its length bearing surfaces 107, which bearing surfaces are disposed between individual lobes 108 formed on the intake camshaft 106. Each lobe 108 is associated with a respective one of the tappets 104 for effecting its reciprocation in its tappet receiving bore 103 upon rotation of the intake camshaft 106.

A plurality of bearing caps 109 are affixed to the cam carrier member 98 and the cylinder head casting 41 by certain of the fasteners 99. It should be also noted that the cam carrier member 98 is provided with a plurality of bosses 109 at spaced locations along its length, which bosses receive other fasteners 111 that fix the cam carrier member 98 to the cylinder head casting 41 independently of the fasteners 99. Said another way, the cam carrier member 98 is first affixed to the cylinder head casting 41 by the fasteners 111. The tappets 104 are then put in place and the camshaft 106 installed. Finally, the bearing caps 108 and fasteners 99 are installed so as to complete the journaling of the intake camshaft 106 in the carrier member 98 and to complete its attachment to the cylinder head casting 41.

The intake camshaft 106 is driven at one-half the rotational speed of the camshaft 37 by a timing mechanism which will also be described later.

The mechanism for actuating the exhaust valves 95 will now be described by reference to the same figures. This mechanism is, basically, the same in general construction as that associated with the intake valve 62, 66 and 73 for their actuation and comprises an exhaust cam carrier member, indicated generally by the reference numeral 112. The exhaust cam carrier member 112 is affixed to the exhaust side of the cylinder head 41 by a first series of fasteners 113 which extend through lugs 114 formed on the outer side of the exhaust cam carrier 112. In addition, there are provided further apertures which receive additional threaded fasteners 115 that function like the threaded fasteners 99, as will become apparent.

The exhaust cam carrier 112 is provided with bridging sections 116 that are associated with each cylinder, and each of which has a pair of tappet receiving bores 117. The bores 117 extend parallel to the axes of the stems 75 of the exhaust valves 95. Rather than being coaxial, however, the bores 117 may be offset toward the center of the cylinder head as best seen in FIG. 2 relative to the valve stem axes so as more effectively utilize the space.

Tappet assemblies, indicated generally by the reference numerals 118 are slidably supported within the bores 117 and cooperate with the valves 95 for their actuation in a manner which will be described. Some of the tappets 118 may include a mechanism whereby the actuation of the associated exhaust valve may be disabled or its lift varied, as will also become apparent.

The exhaust cam carrier member 112 is also provided with integral bearing surfaces 119 that are disposed on opposite sides of each cylinder and which cooperate with bearing surfaces 121 formed on an exhaust camshaft, indicated generally by the reference numeral 122 for its rotational support. The exhaust camshaft 122 has individual cam lobes 123, each associated with one of the tappets 118 for actuating it in a manner which will be described.

Finally, a plurality of bearing caps 124 are affixed to the exhaust cam carrier 112 by the threaded fasteners 115 for completing the journaling of the exhaust camshaft 122 and also the attachment of the exhaust cam carriers 112 to the cylinder head 41.

Figure 6:
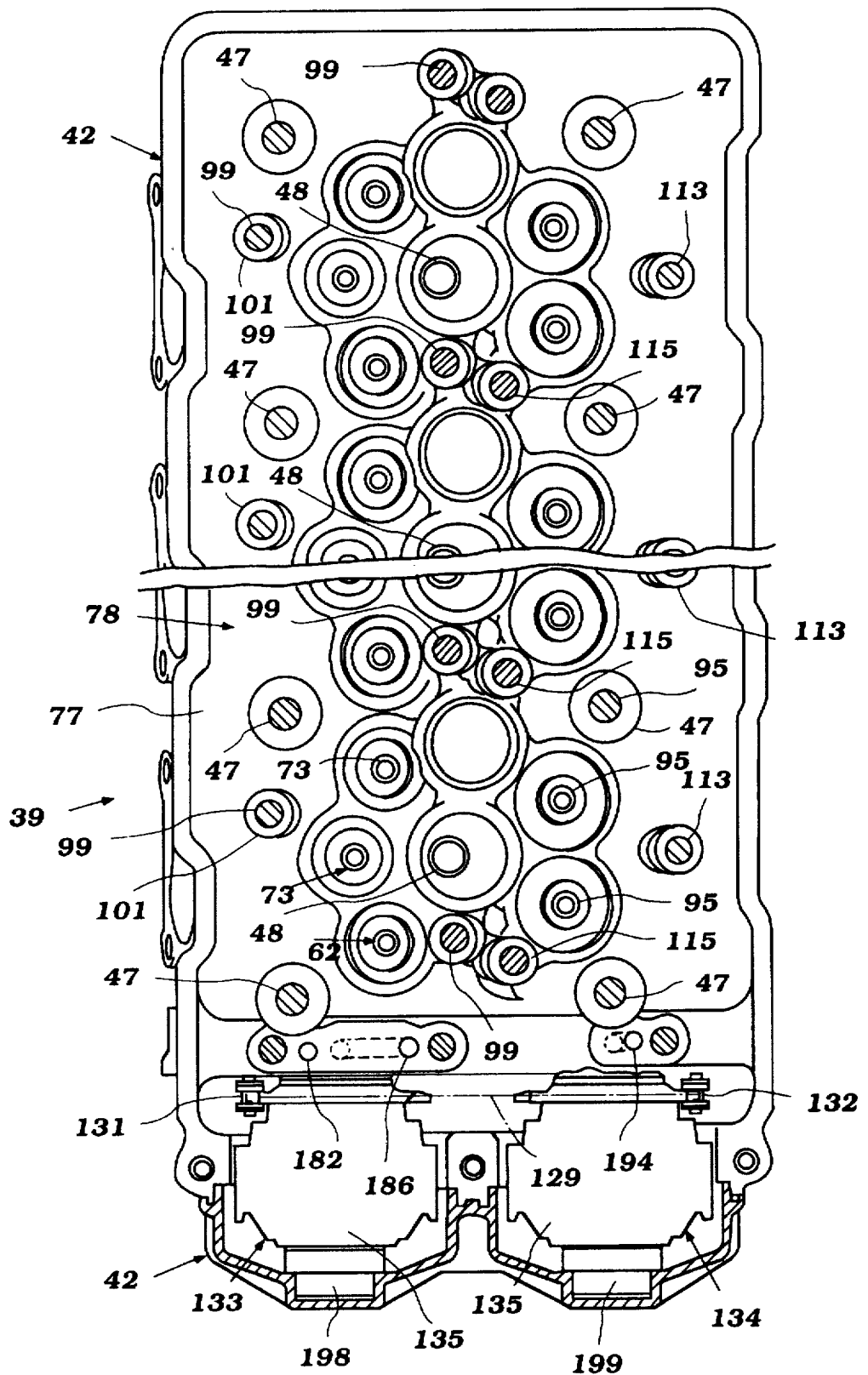
FIG. 6 is a top plan view of the cylinder head with the cam cover removed, with portions of the valve actuating mechanism removed and other portions broken away and shown in section.
Figure 7:
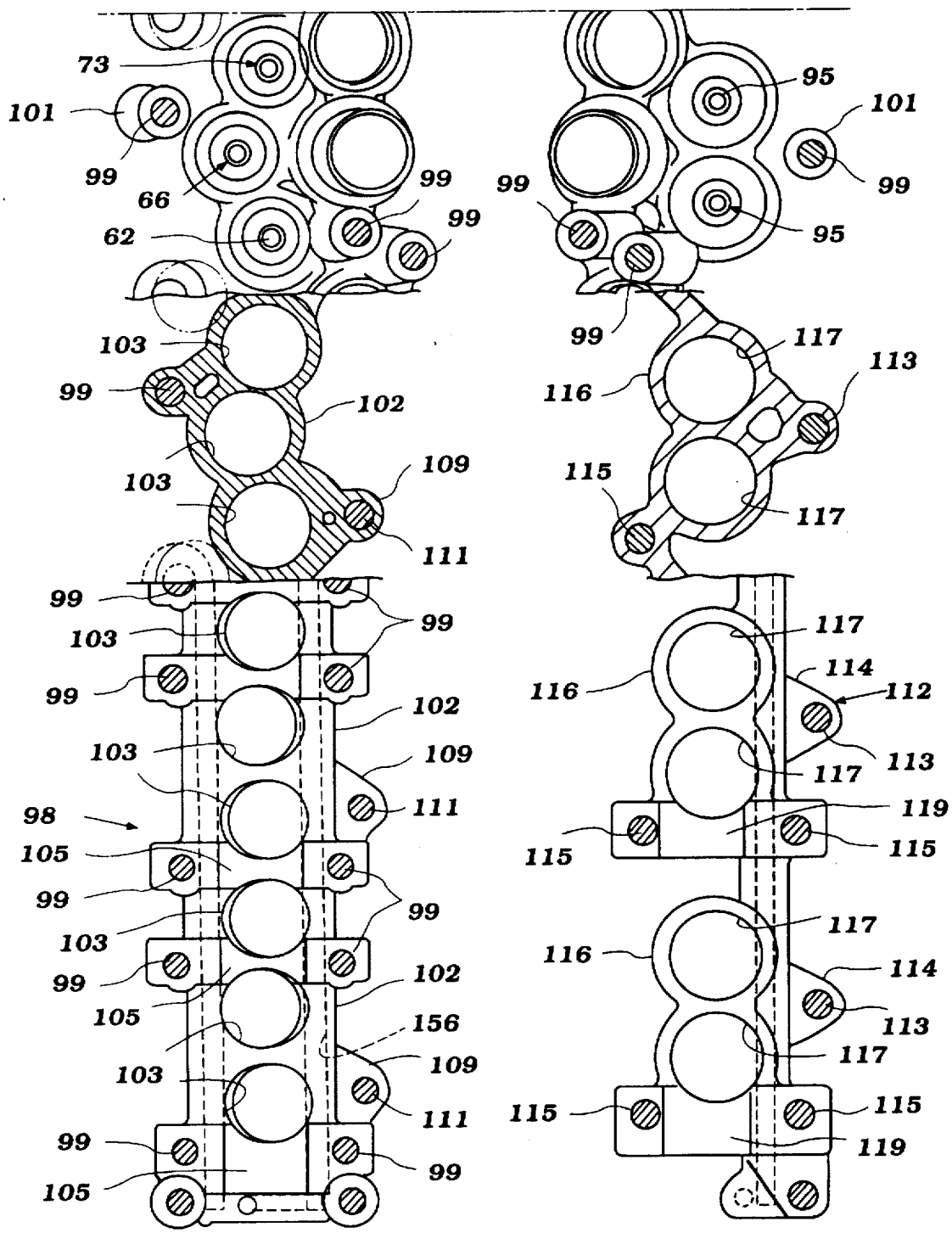
FIG. 7 is a further enlarged top plan view looking in the same direction as FIG. 6, but showing, from the top to bottom of the view, the upper surface of the cylinder head casting, a cross-section through the cam carriers and tappet receiving members, and a top plan view of the cam carriers and tappet receiving members with the bearing caps therefor removed.
Figure 8:
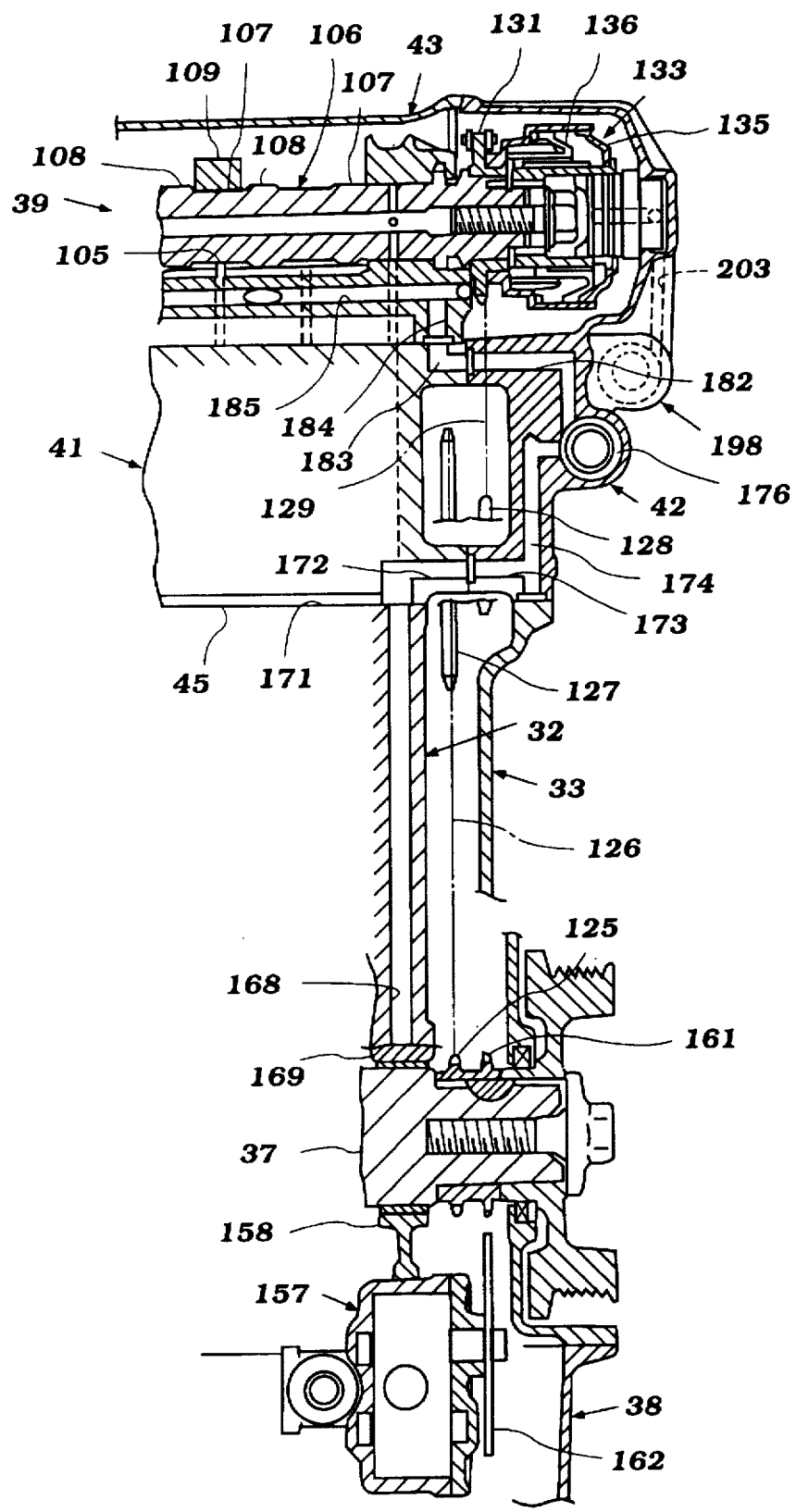
FIG. 8 is a cross-sectional view taken along a plane extending perpendicularly to the plane of FIG. 1, at the front portion of the engine, and shows the camshaft drive, control valving associated with the valve actuating mechanism, and other related components.

The drive for the intake and exhaust camshafts 106 and 122 will now be described by primary reference to FIGS. 6 and 8. As may be seen best in FIG. 8, the forward portion of the crankshaft 37 extends beyond the front of the cylinder block 32 and through the timing case cover 33. A sprocket assembly 125 is affixed to the portion of the crankshaft 37 confined within the timing case 33. This drives a first timing chain 126 which, in turn, drives a first or driven sprocket 127 that is journaled on a bearing provided by the forward end of the cylinder head 41.

The driven sprocket 127 has affixed for rotation with it a further sprocket 128 which is, in turn, engaged with a timing chain 129. The timing chain 129 drives an intake camshaft sprocket 131 and an exhaust camshaft sprocket 132. In accordance with this embodiment of the invention, the intake and exhaust camshaft sprockets 131 and 132 are not directly affixed for rotation with -the intake and exhaust camshafts 106 and 122, respectively. Rather, each drives a respective variable valve timing mechanism (VVT), indicated generally by the reference numeral 133 and 13, both of which are contained within the timing case cover 42.

The VVT mechanisms 133 and 134 have the same general construction and this comprises an outer housing 135 in which a variable timing mechanism including a slidably supported, hydraulically actuated plunger 136 is positioned. By pressuring a chamber associated with the plunger 136, in a manner to be described, the timing relationship between the sprockets 131 and 132 and the camshafts 106 and 122 can be altered to change the overlap between the timing in response to any desired control strategy. The system for achieving this pressurization will be described later.

Next will be described the tappet and valve controlling mechanisms 104. As has been previously described, certain of these mechanisms are effective to control selectively the opening and closing and/or the lift of the associated valve.

Illustrated in FIGS. 10–15 is a tappet and valve actuating mechanism 104 that is effective to achieve this function. In the first embodiment of this invention, such a mechanism is employed between the intake camshaft 106 and the center intake valve 66, the first side intake valve 62 and one of the exhaust valves 95. As will be described later, it will be apparent that such mechanisms may be selectively employed with any or all valves depending upon the results to be obtained. Also, although the description is that associated with the valve controlling tappet 104 associated on the intake side of the engine, it will be readily apparent that the same type of arrangement can be utilized on the exhaust side. In fact, as will be seen from FIG. 4, such a similar arrangement is utilized in one of the exhaust valve controlling tappets 118.

The valve controlling tappet assembly 104 is comprised of a tappet body that consists of a first cylindrical tappet body portion 137 which may be formed from any suitable lightweight material such as aluminum or an aluminum alloy. This body portion is closed at its upper end by a hardened cap 138 which may have its height or thickness varied so as to adjust the clearance between the cam lobes 107 and this surface. Alternately other known type of adjustment may be employed.

The cylindrical body portion 137 is provided with a central bore 139 that receives the shank portion 141 of an associated valve actuating plunger, indicated generally by the reference numeral 142.

A coil compression spring 143 is loaded between a lower end plate 144 of the plunger 142 and a wall part 145 of the cylindrical body 137 formed around the bore 139. The spring 143 normally urges the plunger 142 axially away from the tappet body member 137 to an extended position as shown in FIGS. 2, 3, 4, 10, 12 and 14 of the drawings in the condition when the respective intake camshaft cam lobe 107 or exhaust camshaft cam lobe 123 is not in engagement with the disk-shaped element 138 of the respective valve actuating tappet 104 or 118. It should be noted that the spring 143 has a lighter rate and preload than the valve springs 81 for a reason which will become apparent.

The cylindrical tappet body 137 is formed with a transversely extending bore 146 which intersects the bore 139 and which extends through its outer surfaces. A control piston or plunger 147 is slidably supported within this bore 146. A coil compression spring 148 is loaded between one end of the piston 147 and a closure plate 149 that is fixed into a bore formed in the outer peripheral edge of the cylindrical member 137. This closure plate 149 is normally engaged with a shoulder 151 of the tappet body 137.

The coil spring 148 normally urges the control piston 147 to a position wherein a bore 152 formed therein is in concentric relationship to the tappet body bore 139 and which bores slidably accommodate the plunger portion 141. The position of the control piston 147 in this condition is controlled by a retaining snap ring 153 that is received within a suitable groove in the tappet body 137 at the outer end of the bore 146 opposite the closure plug 149.

Figure 12:
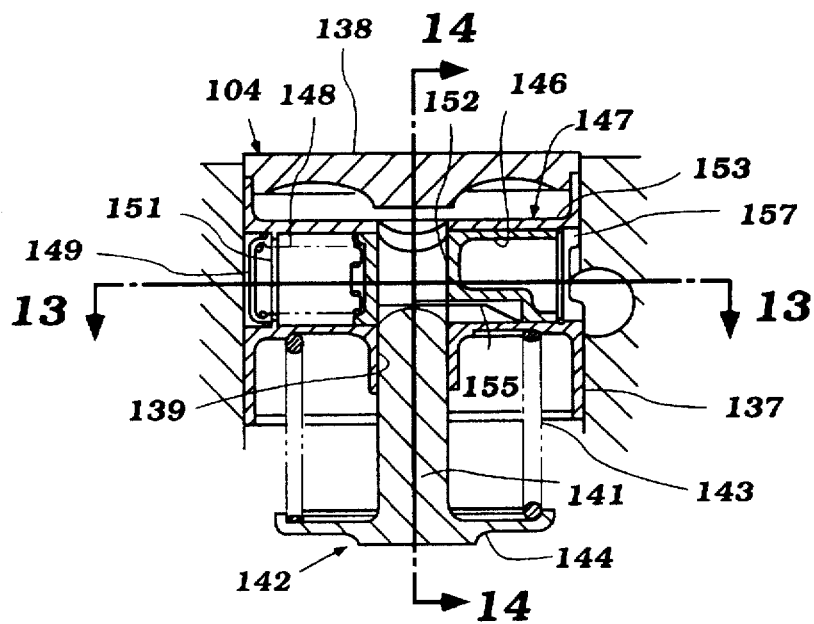
FIG. 12 is a cross-sectional view, in part similar to FIG. 10, but shows the valve actuating mechanism in the valve de-actuating condition and before the cam has depressed the tappet body.
Figure 13:
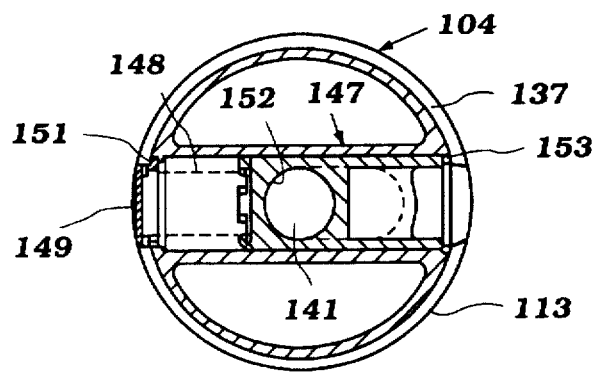
FIG. 13 is a cross-sectional view, in part similar to FIG. 11, but taken along the line 13—13 of FIG. 12 and showing the valve actuating mechanism in the same condition.
Figure 14:
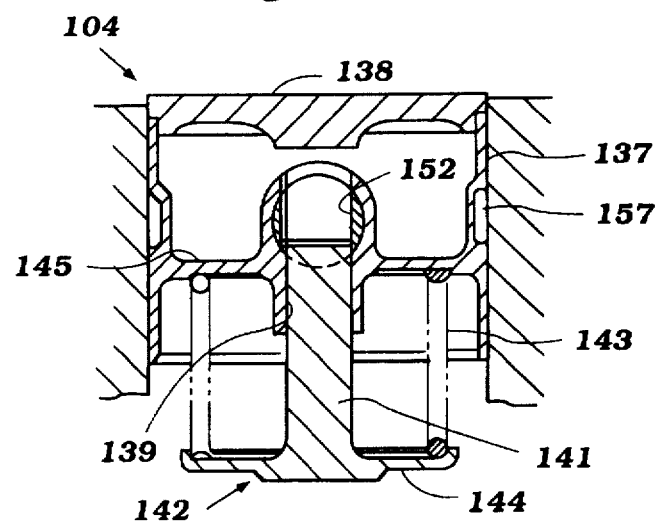
FIG. 14 is a cross-sectional view taken along the line 14—14 of FIG. 12 and shows the valve actuating mechanism in the same condition.

Hence when the control piston 147 is in the position shown in FIGS. 12–14 and tappet body 104 is slid in the bore 103 of the carrier member 102, the tappet body will move downwardly and the coil spring 143 will compress. This occurs because the spring 143 preload and rate is of a lower than that of the spring 81 of the associated intake valve. Hence, reciprocation of the tappet body 137 will occur without any motion of the actuating plunger 142 or of the associated intake valve. Hence, in this condition, the associated intake valve is not opened and closed. Obviously, the same is true with respect to the situation if the tappet body was associated with an exhaust valve.

Figure 15:
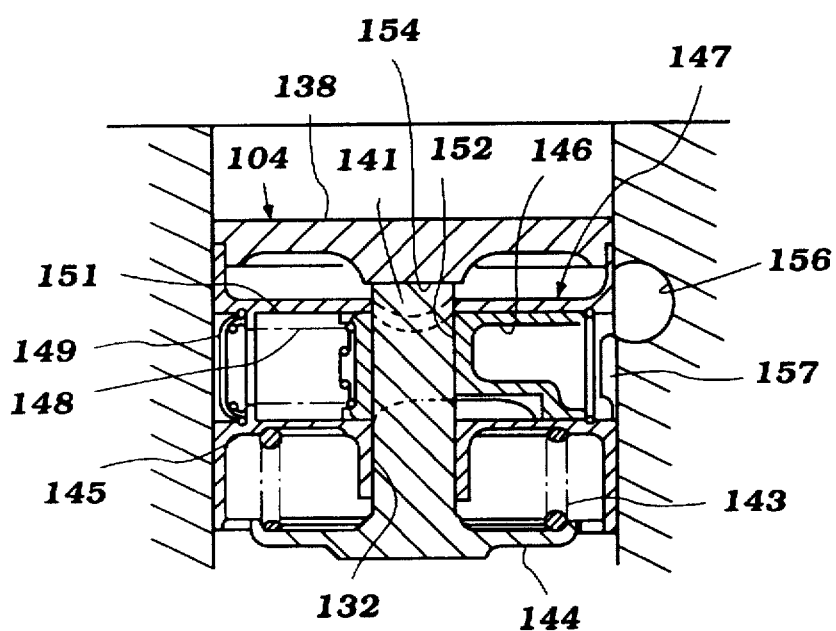
FIG. 15 is a cross-sectional view, in part similar to FIGS. 10 and 12, and shows the valve actuating mechanism after the cam has fully depressed the tappet body.

FIG. 15 shows the construction when the tappet body has been fully depressed. In this condition, no opening of the associated valve will occur. However, and as should be readily apparent to those skilled in the art, the arrangement could be such that rather than no opening the associated valve would be open but at a reduced lift. The amount of opening could be controlled by changing the length of the plunger portion 141. In this condition, a projection 154 formed on the underside of the tappet cap 138 could contact the plunger 141 and effect some reciprocation of it depending upon the length of the plunger 141 and the height of the projection 154.

Figure 10:
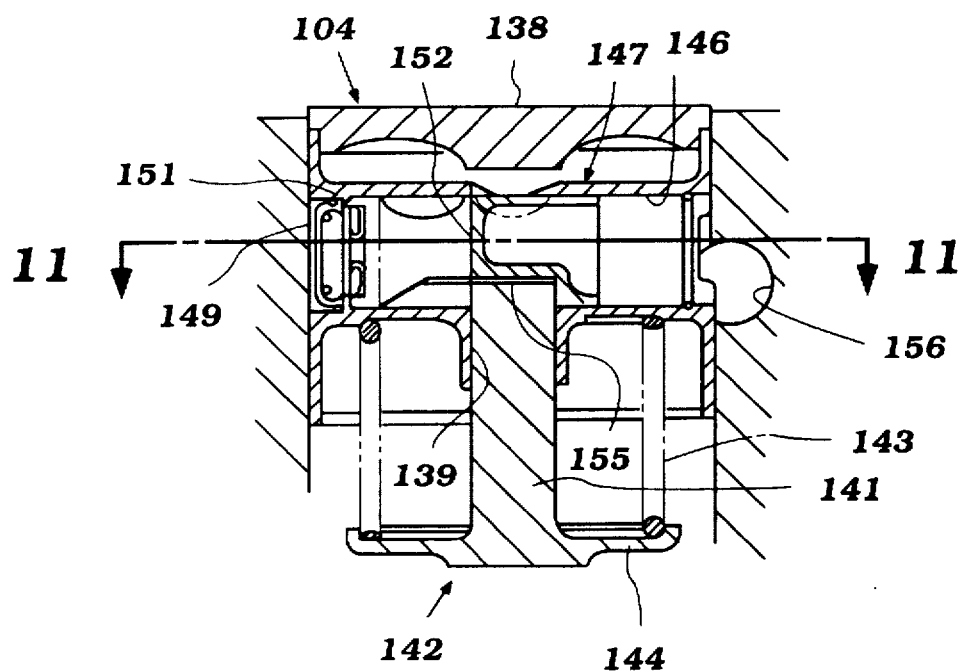
FIG. 10 is a cross-sectional view taken through one of the selectively operable valve actuating mechanisms and shows this mechanism in the valve actuating mode.
Figure 11:
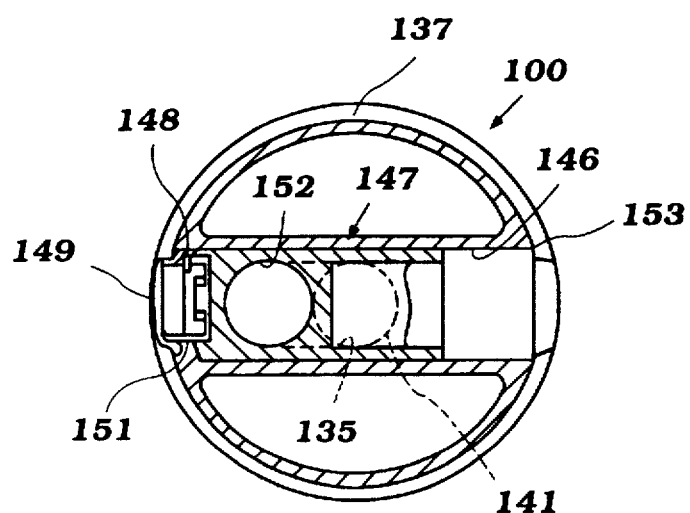
FIG. 11 is a cross-sectional view taken along the line 11—11 of FIG. 10 and shows the valve actuating mechanism in the same condition.

If normal, full lift of the valve associated with the actuating tappet 104 is required, then the control piston 147 is shifted to the conditions shown in FIGS. 10 and 11 so that a slotted surface 155 of the piston 147 will be placed in confronting relationship with the plunger 141 to actuate it in a normal manner. To accomplish this, fluid pressure is asserted in the bore 146 through the opening provided by the snap ring 153. Thus, an oil supply gallery 156 is formed in the cam carrier body 98 and is pressurized, in a manner now to be described, so as to urge the control plunger 147 to the left so that the associated intake valve will be normally operated.

It should be noted that the external surface of the tappet body 137 is provided with a circumferential groove 157 that will communicate with a drilled gallery 156 regardless of the rotational position of the tappet assembly 104 in the bore 103.

The system for controlling the operation of the valve actuation tappets 104 and 118, as well as the variable valve timing mechanisms 133 and 134, and also the lubrication of the engine, will not be described by reference primarily to FIGS. 1, 7, 8 and 16, although certain of the components appear in other figures.

Figure 16:
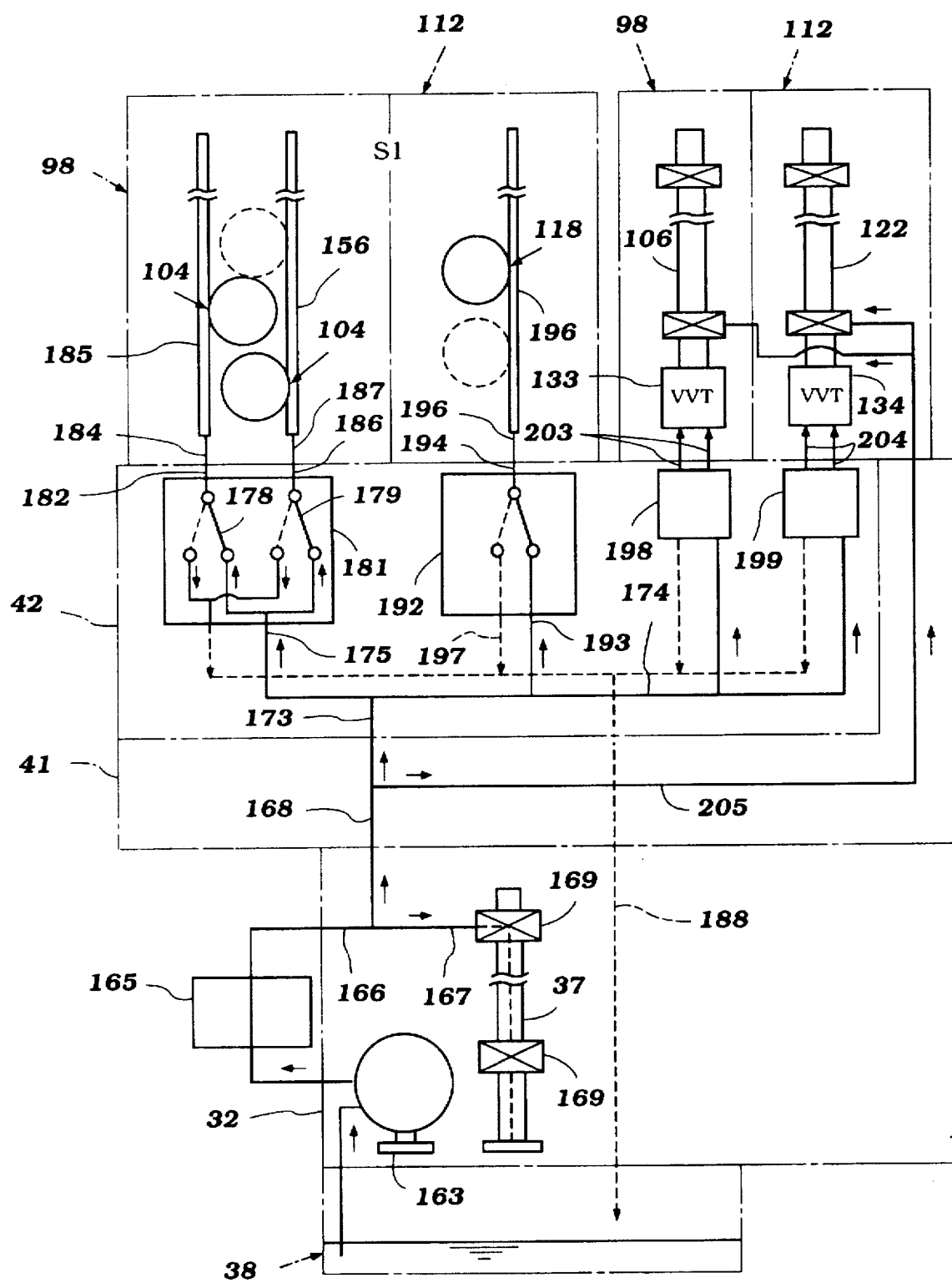
FIG. 16 is a schematic view showing the hydraulic circuitry for lubricating the engine and for controlling the valve operating mechanism. The phantom line boxes show in which component of the engine the particular schematically illustrated components are found.

As has been noted, the engine 31 is provided with a crankcase 38 and this is at least partially filled with lubricant as shown in schematic view of FIG. 16. This assumes that the engine 31 is of the wet sump type. It will be readily apparent, however, how the invention may be also applied with dry sump engines.

An oil pump 157 is mounted in the lower portion of the crankcase on, for example, one of the main bearing caps 158 that journal the crankshaft 37. This oil pump 157 is driven by a driving chain 159 through a further sprocket 161 formed adjacent the timing chain driving sprocket 121 on the crankshaft. A driven sprocket 162 is affixed to the input shaft of the oil pump 157 and is driven by the chain 159.

The oil pump 157 has a pick-up 163 that depends into the oil in the crankcase 38 for delivery to the pump 157. This pressurized oil is then delivered through a conduit 164 which may be formed in part in the cylinder block 32 to an oil filter 165 of any known type. From the oil filter 165, there is provided a main supply gallery 166 that delivers the filtered oil to a first engine lubricating supply line 167 and a second control and lubrication line 168. The supply line 167 delivers lubricant to the bearings of the crankshaft 37, indicated schematically at 168, and other components of the engine for normal lubrication in any well known manner.

The control line 168 extends upwardly through the cylinder block 32 and terminates in a discharge opening formed in a surface 171 formed in the area of the cylinder block 32 where it is sealingly engaged with the cylinder head 41. The cylinder head 41 is, therefore, in turn formed with a drilled passageway 172 that delivers oil to an oil gallery 173 formed in the upper timing case cover 42.

The passage 173 communicates with a main control gallery 174 formed in the upper timing case cover 42 and this terminates in four branch conduits. The first of these branch conduits, indicated generally by the reference numeral 175, extends to an intake valve actuating control assembly, indicated generally by the reference numeral 176, and which is mounted on the intake side of the cylinder head and specifically on the front cover 42. This control valve assembly 176 includes a pair of electrically operated solenoids, 177, that each operate a respective switch valves 178 and 179. The control strategy for this structure will be described later. These valves are contained within a valve body 181.

The switch valve 178 controls the flow through a supply passageway 182 formed in the timing case cover 42 and which communicates with a further supply passageway 183 formed in the cylinder head 41. This passageway, in turn, communicates with a passageway 184 which, in turn, communicates with a drilled passageway 185 that is formed in the intake cam carrier 98 and which intersects only the bores 103 that communicate with the valve actuating tappets 104 associated with the center intake valves 66 of each cylinder. Hence, the gallery 185 controls the opening and closing of the center intake valve 66 for each cylinder.

In a similar manner, the switch valve 179 controls the flow to the aforenoted drilled passageway 156 through passages 186 and 187 formed in the timing case 42 and cylinder head 41, respectively, and which appear only in FIGS. 1 and 16.

Again, because of the angular disposition of the respective tappets, only the tappet associated with the first side intake valve 61 will be controlled. As may be seen in FIG. 4, the tappet associated with the remaining side intake valve is a conventional tappet and has no disabling mechanism associated with it in this embodiment. Thus, although the passageway 156 intersects the tappet bore 103 associated with this tappet, there will be no hydraulic control because the tappet 104 does not contain one.

The switch valves 178 and 179 in their disabling condition communicate the galleries 185 and 156 with a drain line, shown schematically at 188 through appropriate passages formed in the upper timing case cover 42 and cylinder block 41. This passageway 188 like the other drain passageways communicates with the crankcase chamber formed in the crankcase member 38 in any appropriate manner.

An exhaust control switching valve, indicated generally by the reference numeral 189, is mounted on the front of the upper timing chain case 42 on the exhaust side of the cylinder head 41. This includes an electrically operated actuator 191 and a switching valve 192. A supply branch conduit 193 extends from the main control gallery 174 to this switching valve 192. The switching valve 192 selectively supplies hydraulic pressure or dumps it to a supply conduit 194 formed in the upper timing case cover 42 which communicates with a further conduit 195 formed in the cylinder head and exhaust cam carrier 112. This conduit 195 communicates with a drilled passageway 196 that extends along the exhaust side of the cylinder head and which communicates with the tappet receiving bores 113 formed therein.

As may be seen in FIGS. 2 and 4, one of the tappets 112 associated with one of the exhaust valves 95 is conventional and has no hydraulic control. The remaining tappet is hydraulically controlled in the same manner as the intake system, as previously described. Again, a return conduit 197 dumps the pressure conduit back to the reservoir when it is desired to disable the associated exhaust valve 95.

It has also been noted that the VVT mechanisms 133 and 134 associated with the intake and exhaust camshafts 106 and 122 are hydraulically operated. To control these mechanisms, switching valves 198 and 199 are associated with each of the VVT mechanisms 133 and 134, respectively. These switching valves are carried by the upper timing case 42. These switching valves also include solenoid type actuators 201 and 202, respectively, for selectively supplying controlled fluid pressure through supply lines 203 and 204 to the VVT mechanisms 133 and 134 for controlling their operation in accordance with any desired control strategy.

Finally, the control supply line 168 further has a lubricating branch 205 formed in the cylinder block 41 and which communicates with a similar passageway formed in the cylinder head 42 for supplying lubricant to the camshafts 106 and 122 for their lubrication in any known manner.

A preferred mode of operation of the valves of this embodiment may be best understood by reference to FIG. 9. The three views in this figure labeled a, b and c, show the running conditions at low load, low speed; mid speed and mid load, and high speed/high load, respectively. In order to understand the operation, the exhaust valves 95 have been labeled 95-1 and 95-2 with the exhaust valve 95-2 comprising that valve in which the hydraulic actuator is supplied so that the opening and closing of the valve can be controlled independently of the action of its camshaft and the associated cam lobe.

At low speeds and low loads, the center intake valve 66 and the first side intake valve 62 are disabled. That is, no hydraulic pressure from the lubricant is supplied to its respective actuating tappet 104 and hence the tappets are in the condition as shown in FIGS. 12–14 wherein the valves 62 and 66 will not be opened even when the intake camshaft 106 is rotating.

In a similar manner, the tappet associated with the exhaust valve 95-2 is not supplied with hydraulic pressure and accordingly this valve also will not be opened and closed under this running condition.

Therefore, the entire intake charge is delivered through the relatively smaller second side intake valve seat 72 upon opening of its intake valve 3. As noted in FIG. 9a, the fuel injector 86 will spray fuel toward both the valve seats 65 and 72. However, since all of the air will be flowing into the combustion chamber through the valve seat 72, the fuel will be swept in this direction and very little fuel, if any, will be deposited in the center intake passage portion 55.

Figure 3:
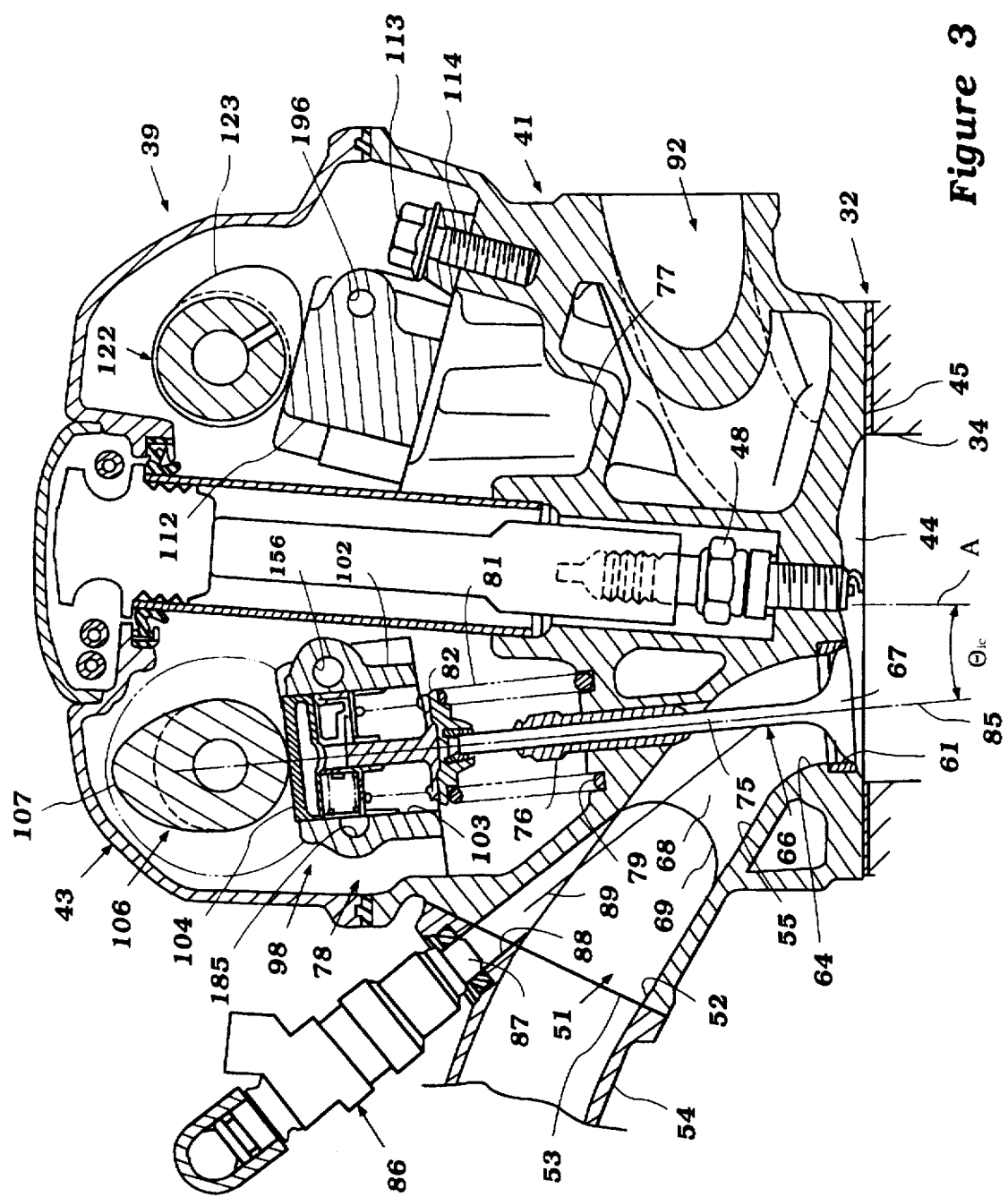
FIG. 3 is an enlarged cross-sectional view taken along the line 3—3 of FIG. 5.

Since the second side intake valve seat 72 is disposed at one side of the combustion chamber and also disposed at least in part lying over the plane B that contains the cylinder bore axis A, the charge entering the combustion chamber will effect both a swirl in the combustion chamber and a tumble in a clockwise direction as seen in FIGS. 2 through 4. The resulting motion will be that which is referred to as slant-tumble. Since only the single intake passage is supplied, even though a small amount of air is inducted, it will flow at a relatively large velocity due to the relatively small flow area which the valve seat 72 provides. Hence, there will be substantial turbulence in the combustion chamber. The fact that only the exhaust valve 95-1 opens and closes will also augment this swirling action.

As the engine speed and load increases, the system moves to the control condition shown in FIG. 9b, wherein the remaining side intake valve 62 begins to become actuated. At the same time, the remaining exhaust valve 95-2 will also be activated and the engine will operate like a 4 valve-per-cylinder engine. However, since both the side intake valves 62 and 73 and specifically their intake valve seats 61 and 62 are disposed on and in part across the plane B, they will act together so as to create a tumble action in the combustion chamber. Hence, the action is converted from the low speed, slant-tumble to mid-range pure tumble. This tumble will still be at a relatively high velocity because of the fact that the diameter $D_{is1}$ and $D_{is2}$ are relatively small, but nevertheless large enough to provide adequate air flow for this running condition.

Finally, at full load the remaining and larger center intake valve 66 is activated and the engine now runs as a 5 valve-per-cylinder engine. Thus, large air charges can be inducted and high power outputs achieved.

In the embodiment as thus far described, the center intake valve 66 and its valve seat 61 are disposed a substantial distance from the plane B and thus the charge which is inducted through this intake passage will tend to create a counter-tumble action in a counter clockwise direction that opposes the tumble action generated by the side intake valves 62 and 73 and their respective valve seats 61 and 72. This may in some instances reduce the actual amount of charge that can be inducted under high-speed/high-load conditions.

Figure 17:
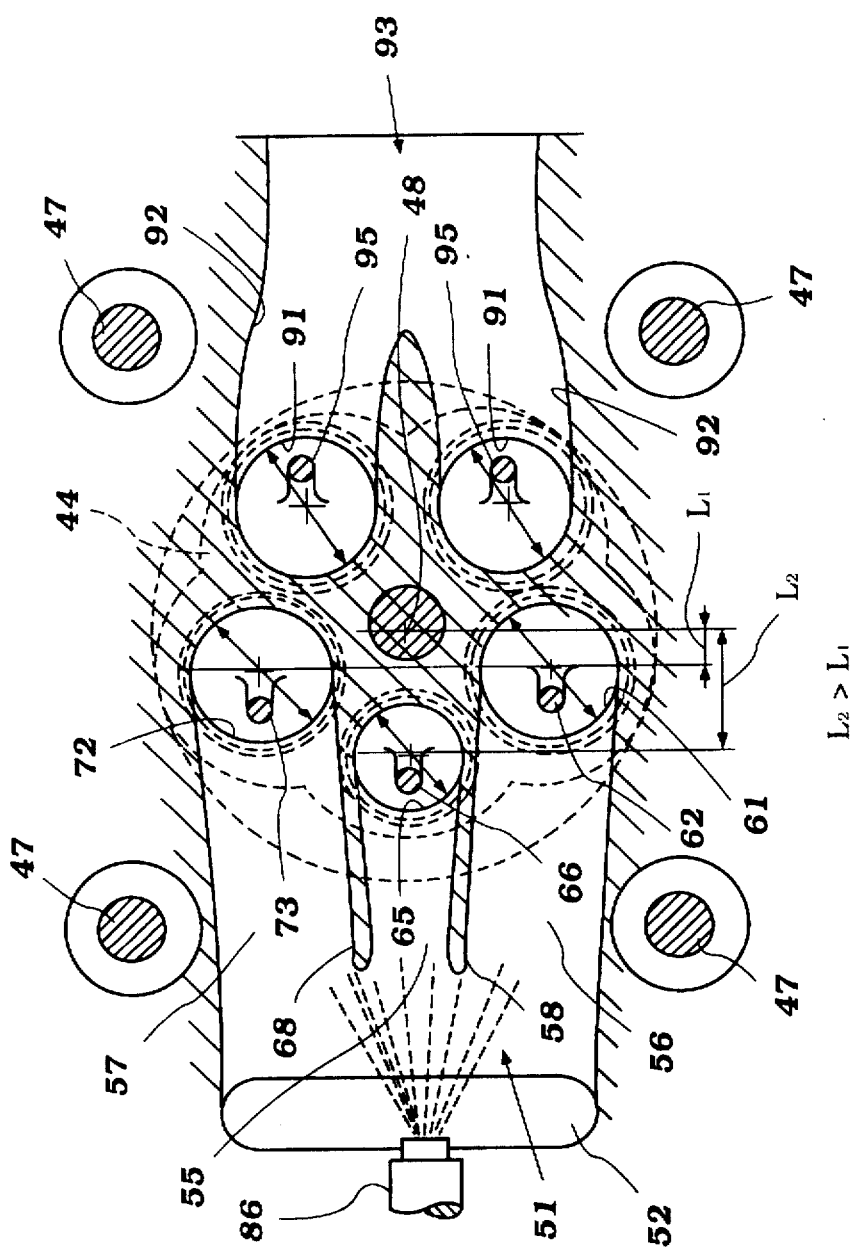
FIG. 17 is a cross-sectional view, in part similar to FIG. 5, and shows another embodiment of the invention.
Figure 18:
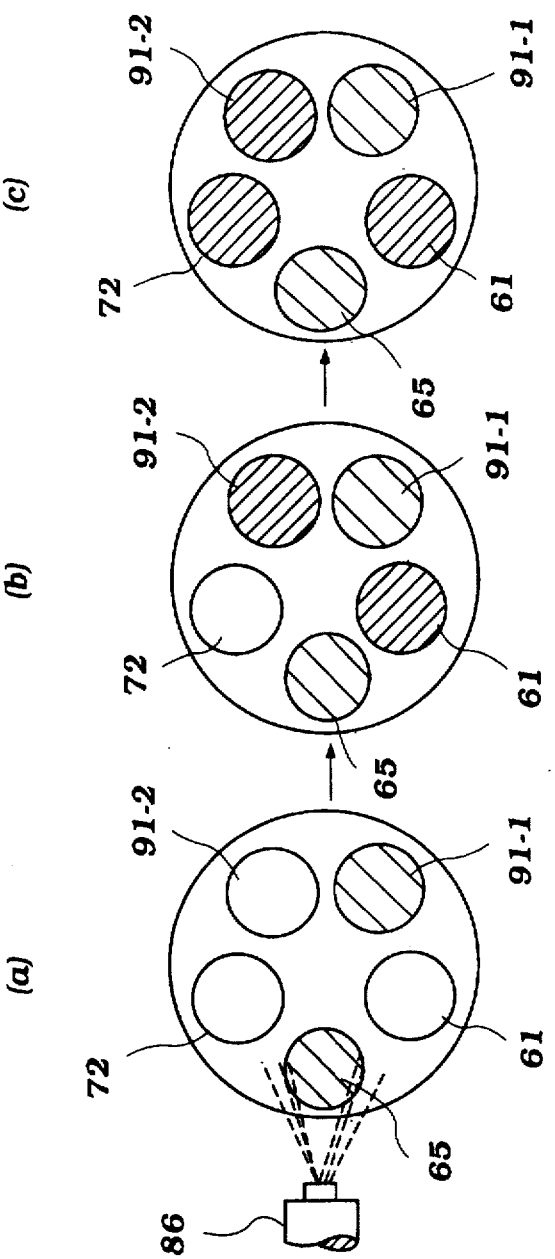
FIG. 18 is a schematic view, in part similar to FIG. 9, but shows the condition of the various valve actuators in accordance with the embodiment of FIG. 17 using the same convention as employed in FIG. 9 and also showing the same respective running conditions.

FIGS. 17 and 18 show another embodiment of the invention wherein this effect is reduced. The actual structure in this embodiment is generally the same as that already described. The only differences between this embodiment and the previously described embodiment is the size of the respective valves and the relation of their size. Therefore, the valves and other components of the engine have been identified by the same reference numerals even though their configuration may be slightly different, as will be described.

In this embodiment, the side intake valves 62 and 73 and their valve seats 61 and 72 again have the same diameter but this diameter is larger than that of the previously described embodiment. In addition, in this embodiment, both of the side intake valves 62 and 73 are controlled by hydraulic actuators that can disable their operation.

Unlike the previously described embodiment, in this embodiment the diameter of the center intake valve 66 and its valve seat 65 is smaller than not only the diameter of the side intake valves but also smaller than the diameter of the exhaust valves. As may be seen in FIG. 17, this permits the center intake valve to be moved at a closer distance L2 to the plane B than in the previously described embodiment. Hence, the counter-tumble action caused by this intake passage portion 55 will be reduced.

The diameters of the exhaust valves 95-1 and 95-2 and their respective valve seats 91-1 and 91-2 are the same. Hence, the following relationship exists:

$$D_{is1}=D_{is2}>D_{e1}=D_{e2}>D_{ic}$$

Since the center intake valve 65 is the one that is always actuated in this embodiment, the fuel injector 86 and its nozzle 87 is moved to a central disposition as shown in FIGS. 17 and 18. In addition, the dividing walls 58 and 68 are maintained the same length in this embodiment and this length is shorter than the wall 58 of the previous embodiment and longer than the wall 68 of the previous embodiment.

In this embodiment, the side intake valves 62 and 73 are disabled under low-speed/low-load conditions and hence the fuel air charge will be delivered to the combustion chamber through the smaller center intake valve seat 65 when its intake valve 66 is open. Hence, there will still be a high flow velocity but in this embodiment there will be a pure tumble action generated. This tumble action is a counter-tumble action to that provided by the side intake valve seats.

Since only one of the exhaust valves, the valve 95-1, is always opened and closed under this running condition, there may be some slight degree of swirl generated under low-speed/low-load conditions.

As the engine reaches mid-range, then the first side intake valve 62 is activated and its valve seat 61 will be open when the valve is open so as to permit a larger air flow into the combustion chamber. In addition, both exhaust valves are operated under mid-range conditions.

Hence, there will be some tumble now generated but in a direction opposite that at low speed/low load. This is because the side intake valve seat 61 is substantially larger than the center intake valve seat 65 and hence its flow will dominate the action in the combustion chamber. Also since the center intake valve seat 65 is closer to the plane B, its counter-tumble action will not be as great.

At high speed/high load, all of the valves are operated and the engine operates like a conventional 5 valve-per-cylinder engine.

Figure 19:
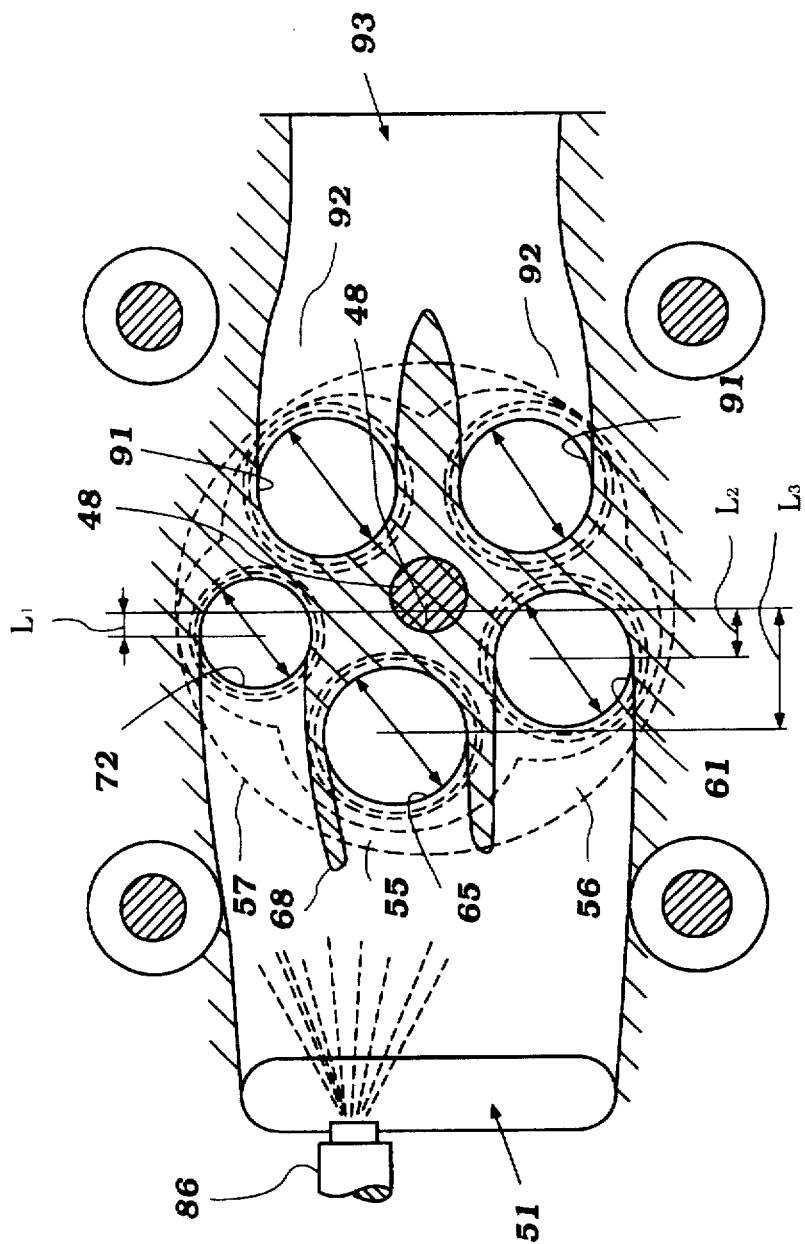
FIG. 19 is a cross-sectional view, in part similar to FIGS. 5 and 7, and shows a still further embodiment of the invention.
Figure 20:
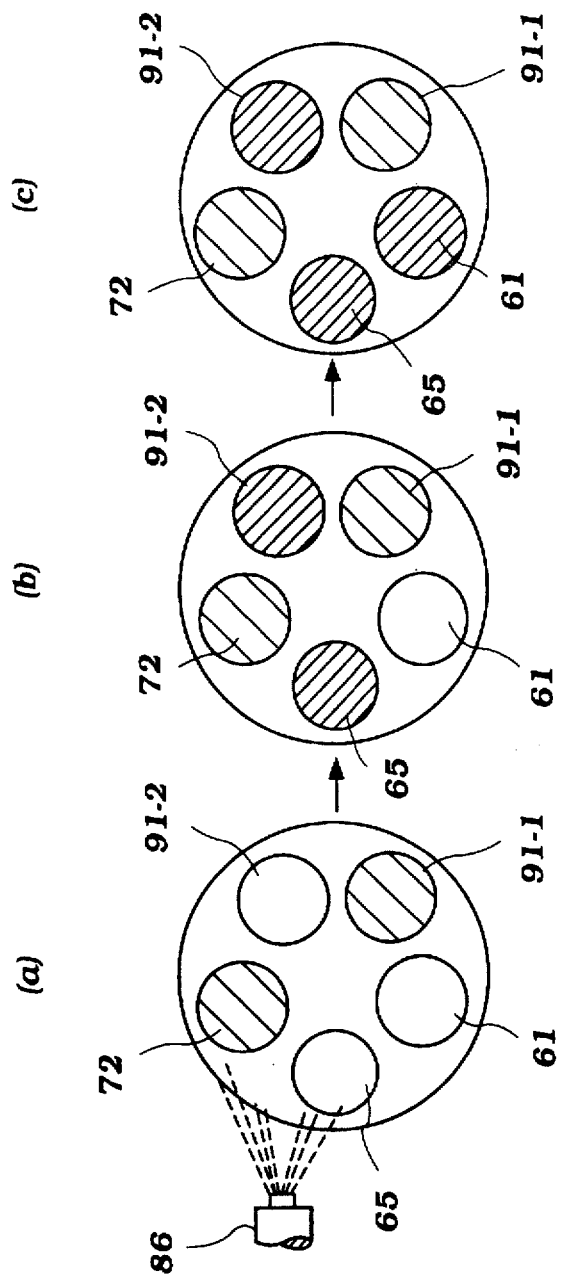
FIG. 20 is a partially schematic view, in part similar to FIGS. 9 and 18, but shows the valve conditions in accordance with the three different running conditions for the embodiment of FIG. 19 and utilizing the same convention as employed in the earlier figures.

FIGS. 19 and 20 show another embodiment which is like the embodiments previously described and has more similarity to the embodiment of FIGS. 1–16 than to the embodiment of FIGS. 17 and 18. For the same reasons previously noted, therefore, the components of this embodiment have been identified by the same reference numerals as previously utilized.

In this embodiment, both the center intake valve 66 and the first side intake valve 62 have disabling actuators and the remaining, second side intake valve 73 is always opened and closed. Also, like the embodiment of FIGS. 1–16, the second exhaust valve 95-2 is selectively actuatable while the first exhaust valve 95-1 is always operated by its cam lobe.

In this embodiment, like each of those previously described, both of the exhaust valves 95-1 and 95-2 and their respective valve seats 91-1 and 91-2 have the same diameter. However, in this embodiment the center intake valve 66 and its valve seat 62 diameter have the same diameters as the first side intake valve 62 and its valve seat 61. These two intake valves and their valve seats 66 and 62 and 65 and 61 have a larger diameter than that of the exhaust valves. The diameter of the remaining and second side intake valve 73 and its valve seat 72 is the smallest. Hence, the following relationship exists.

$$D_{ic} = D_{is1} > D_{e1} = D_{e2} > D_{is2}$$

In this embodiment, the side intake valves and their valve seats 62 and 73 and 61 and 72 have different diameters and hence they have different distances from the plane B. Because of the sizing of the valves and the valve seats, the center intake valve 66 and its valve seat 65 is offset from the cylinder bore axis in the direction of the plane B toward the second intake valve seat 72 and its intake valve 73. This permits the distance $L_3$ between the center of this center intake valve and seat 66, 65, to be closer than if the two side intake valves had the same diameter and were larger. In addition, since the two side intake valve seats and their valves have different diameters, the second intake valve 73 and its valve seat 72 is closer to the plane B than the first intake valve 62 and its valve seat 61, as indicated by the respective distances $L_1$ and $L_2$.

The sequence of operation of the valves in this embodiment is the same as in the embodiment of FIGS. 1–16. That is, in this embodiment the second side intake valve 73 is activated continuously, and at mid-range the center intake valve 66 is operated additionally. At high speed/high load, all of the intake valves are operated. Also, like the previous embodiment, the second exhaust valve 95-2 is only operated during mid- and high-range performance. Because of the smaller diameter of the second side intake valve 73 and its valve seat 72, there will be more pronounced tumble and swirl generated under low-speed/low-load conditions.

In this embodiment the fuel injector 86 is offset as in the embodiment of FIGS. 1–16, but the dividing walls 58 and 68 maintain the same length, as in the embodiment of FIGS. 17 and 18.

Figure 21:
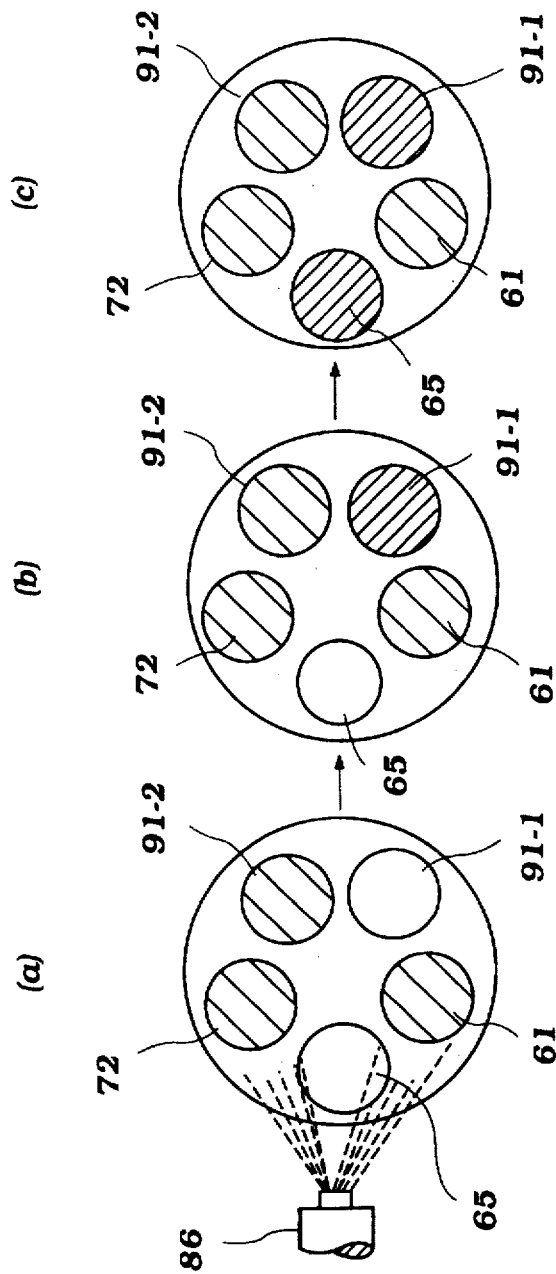
FIG. 21 is a schematic view, in part similar to FIGS. 9, 18 and 20, for a still further embodiment of the invention.

FIG. 21 shows another embodiment of the invention wherein the diameters of the valves have the same relationship as in the embodiment of FIGS. 17 and 18. This embodiment, however, differs from that embodiment in which valves are always actuated and which valves are selectively actuated on the intake side. Hence, only a single figure is believed necessary to permit those skilled in the art to understand this embodiment. In this embodiment the center intake valve 66 is the only intake valve that is selectively activated. That is, both of the side intake valves 62 and 73 are always activated. Like the previously described embodiments, the first exhaust valve 95-1 is always operated, while the second exhaust valve 95-2 is selectively operated.

Because of the fact that the side intake valve 62 and 63 are always operated, in this embodiment the injector 86 is disposed centrally. In addition, it preferably is arranged so that it has a pair of spray nozzle ports that spray toward the side intake valves 62 and 73 and their respective valve seats 61 and 72.

With this embodiment the center intake valve 66 is not activated under low and mid-range running. Mid-range running sees only the second exhaust valve 95-2 activated, and hence the engine operates as a three-valve engine at low speeds and a four valve engine at mid-range. Only at high-speed/high-load conditions is the center intake valve 66 operated. Hence, with this embodiment there will be more tumble generated at low and mid-range than with some of the other embodiments.

Figure 22:
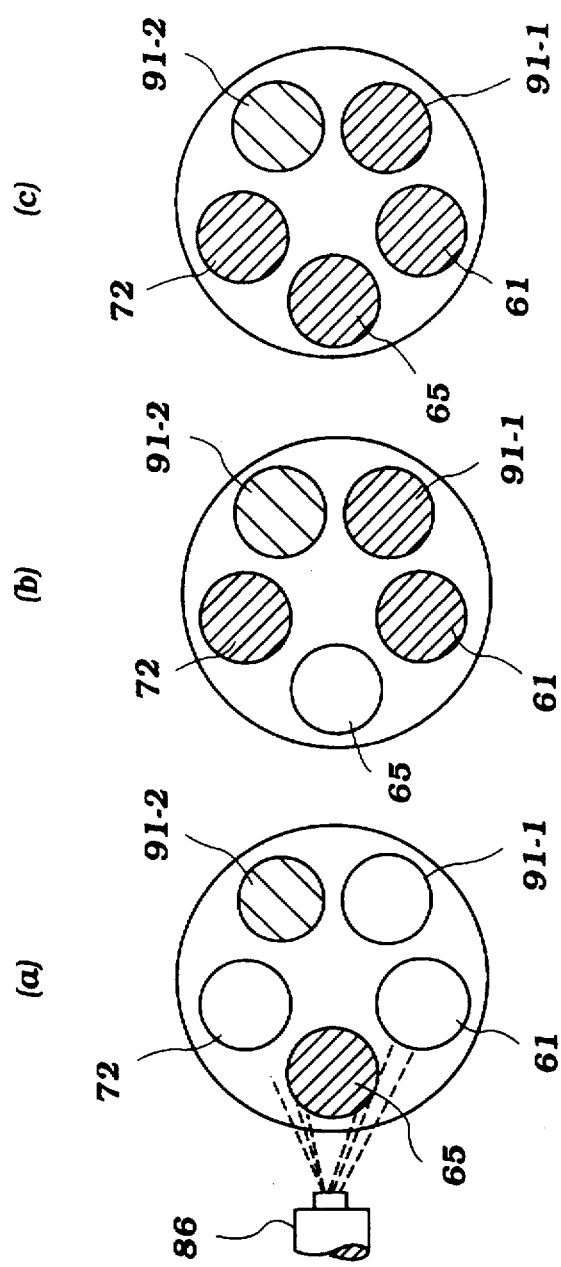
FIG. 22 is a schematic view, in part similar to FIGS. 9, 18, 20 and 21, of a still further embodiment of the invention.

FIG. 22 is another embodiment having the same valve size relationship as the embodiment of FIG. 21. This embodiment differs from that embodiment, however, in that all of the intake valves 62, 65, and 73 are selectively or controllably activated. In this embodiment the second exhaust valve 95-2 is always operated, and the first exhaust valve 95-1 is the controlled exhaust valve.

Thus, in this embodiment at low speed/low load, only the center intake valve 66 is opened and since this valve 66 has the smallest diameter and also is disposed furthest from the plane B, there will be generated a counterclockwise tumble motion under low speed/low load.

At mid-range, this valve is disabled, and only the side intake valves 62 and 73 are activated. Also, both of the exhaust valves 95-1 and 95-2 are operated at mid-range. Hence, the engine operated at mid-range like a four valve engine, but one having clockwise tumble.

At high speed/high load, all of the valves are actuated, and the engine operates like a five valve-per-cylinder engine having high-power outputs while still maintaining good running under low and mid-range conditions.

Figure 23:
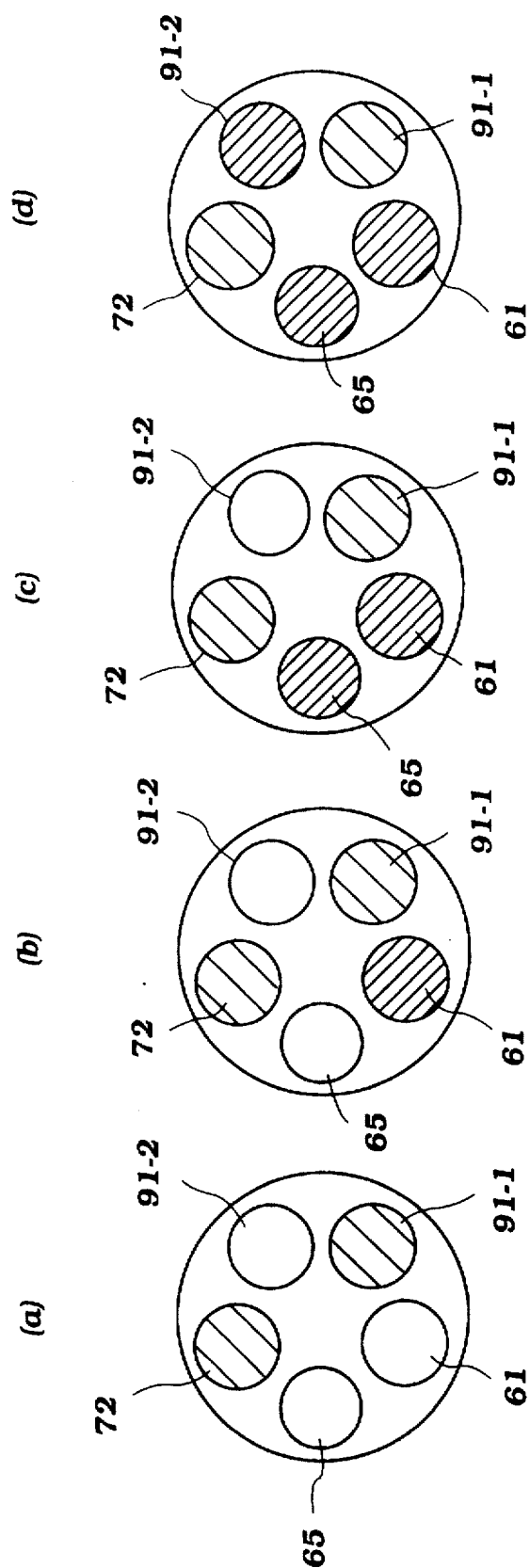
FIG. 23 is a schematic view, in part similar to FIGS. 9, 18, 20, 21 and 22, and shows another possible way in which the valves may be operated adding a fourth engine running stage indicated as c', which is a high load, high speed condition, but less than maximum load and maximum speed conditions.

In all of the embodiments thus far described, the engine has been operated in three stages: a low-speed stage, a mid-range stage, and a high-speed/high-load stage. Obviously, other types of operation with either more or less stages are possible. FIG. 23 shows an embodiment utilizing an engine constructed like the engine of FIGS. 1–16, but wherein there are provided a low-speed/low-load stage (23a), a mid-speed range (23b), and two high-speed ranges, a lower high-speed/high-load range (23c') and a full-load/full-speed condition (23c).

Under the low-speed/low-load condition, only the second side intake valve 73 and the first exhaust valve 95-1 are operated, and hence the engine operates the same as the embodiment of FIGS. 1–16 under this running condition.

Under mid-range running, both of the side intake valves 62 and 73 are operated. However, only the first exhaust valve 95-1 is operated under this mid-range running condition.

When the engine reaches the lower end of the high-speed/ high-load condition, the remaining center intake valve 66 is actuated, but the second exhaust valve 95-2 still is not operating. Hence, the breathing capacity of the engine will be somewhat reduced. At the higher end of the engine speed and load ranges, the remaining exhaust valve 95-2 is operated, and the engine then operates as a five-valve-per-cylinder engine.

Figure 24:
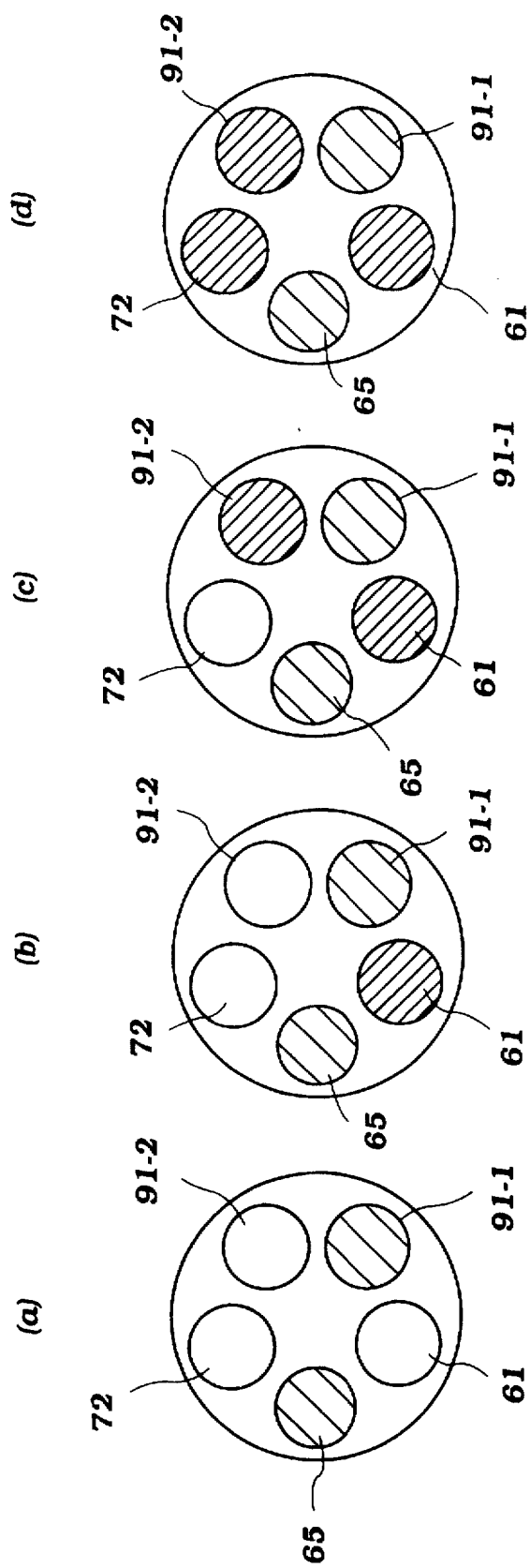
FIG. 24 is a schematic view in part similar to FIGS. 9, 18, and 20–23, and shows another mode in which the valves may be operated wherein there are two different mid-range conditions indicated as a low mid-range b' and high mid-range b.

Although the four stage operation is described in conjunction with an embodiment having a valve arrangement similar to the valve arrangement of FIGS. 1–16, it should be readily apparent that this four stage operation may be enjoyed with any of the valve configurations described. In addition, the four stages may comprise two stages of mid-range running, and such an embodiment is shown in FIG. 24. The low mid-range is indicated at b', while the high mid-range is indicated by the figure b. This particular embodiment employs a valve arrangement of the type shown in FIGS. 17 and 18. However, it should be readily apparent that this four-stage operation may also be employed with other of the valve structures shown.

Under low-speed/low-load running, only the center intake valve 66 and the first exhaust valve 95-1 are operated, and hence this embodiment operates like the embodiment of FIGS. 17 and 18 under low-speed/low-load conditions.

As the engine reaches the low end of the mid-range running, then the first side intake valve 62 is operated, along with the center intake valve 66. Hence, this operation is similar to the mid-range operation of the embodiment of FIGS. 17 and 18, but the second exhaust valve 92 is disabled.

As the engine reaches the higher mid-range operation, then the second exhaust valve 92 is activated, and the system operates like the embodiment of FIGS. 17 and 18 under mid-range running.

Under high-speed/high-load conditions, all of the valves are actuated.

Figure 25:
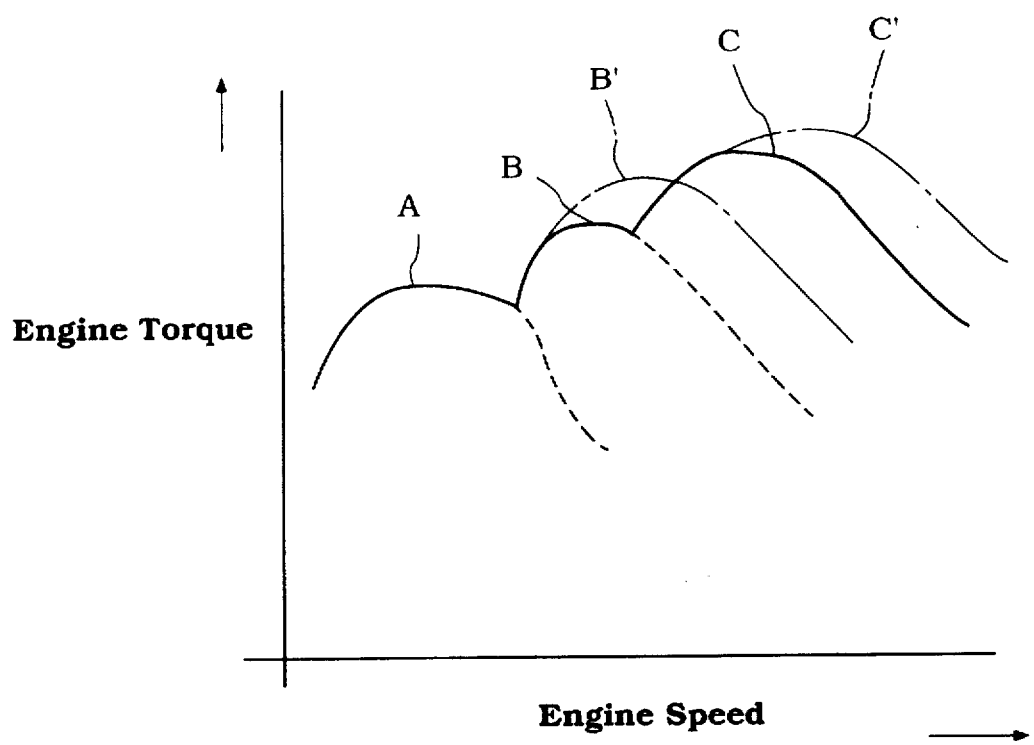
FIG. 25 is a speed vrs torque curve showing the torque curve and how it may be varied by using the various valve opening sequences.

The practical effect of the various stages of engine operation possible by deactivating certain valves during certain running conditions can be appreciated by reference to FIG. 25. In FIG. 25 the solid-line curves showing the ranges A, B, and C are the torque curves generated by the various embodiments that have been described in operating on a three-stage principle. The dot-dash line curve B' shows the effect of adding the second or high intermediate range of operation as shown in the embodiment of FIG. 24. The dot-dash line curve C' shows the two-stage high-speed operation curve generated by the embodiment of FIG. 23. Thus, from this description it should be readily apparent to those skilled in the art that the torque curve of the engine can be varied so as to suit the particularly desired performance characteristics.

Figure 27:
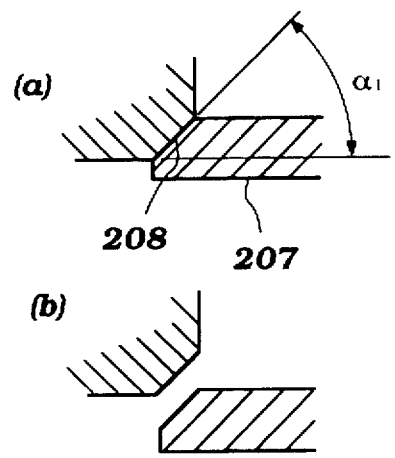
FIG. 27 is a series of cross-sectional views, in part similar to FIG. 26, and shows a different valve seat angle and how it affects the flow pattern.
Figure 28:
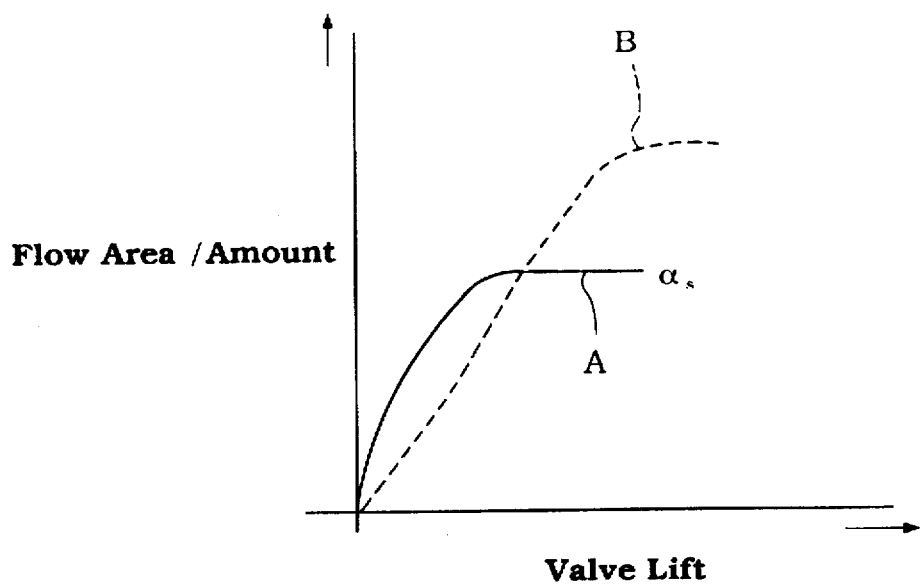
FIG. 28 is a graphical view showing how the valve seat angle affects the amount of airflow at different lifts with the two embodiments shown in FIGS. 26 and 27.

In the description as thus far made, the effective flow of the various valves has been controlled by changing their diameter. In addition to the diameter, the angle of the valve seat also effects the flow pattern into the combustion chamber, and FIGS. 26–28 show how the valve seat angle also can effect the flow into the combustion chamber.

Figure 26:
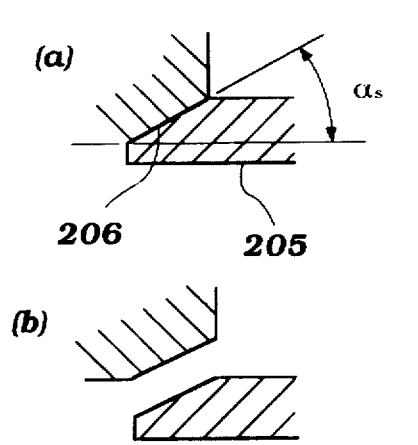
FIG. 26 is a series of cross-sectional views taken through a valve and a valve seats under the closed, partial lift and full lift conditions showing how the valve seat angle influences the flow pattern.

FIG. 26 is an embodiment wherein the valve seat angle $\alpha_s$ is relatively shallow between the intake valve, indicated by the reference numeral 205, and its seat, indicated by the reference numeral 206. As a practical matter and as seen in FIG. 28 which is a graph showing valve lift versus flow amount and effective flow area, it will be seen that the flow area or flow amount does not increase significantly if the valve is opened back past the height $H_s$. Hence, with this type of valve seat angle, an increase in lift will not provide any increase in performance. However, this arrangement does provide a large flow area when the valve is partially opened, as shown by FIG. B, and hence, provides good initial charging to the combustion chamber. Hence, a valve having the valve seat angle $\alpha_s$ will provide good initial charging and is very useful under low-speed/low-load operation.

By increasing the seat angle to a larger angle $\alpha_1$, a greater flow area can be achieved when a higher lift $H_1$ is employed. However, when the valve is only partially opened, as shown in the position B in FIG. 27, it will be seen that the flow efficiency is small. Hence, this type of valve seat angle is more useful for the higher performance end of the engine.

Thus, from the foregoing description it should be readily apparent that the described constructions permit an engine that can have good running over a wide speed and load range. By varying the parameters described, the torque curve can be tuned to the desired or a particular application. Of course, the foregoing description is that of preferred embodiments of the invention, and various changes and modifications may be made without departing from the spirit and scope of the invention, as defined by the appended claims.

I claim:

1. A valve operating mechanism for a reciprocating machine, said machine having a flow path with a valve seat at one end thereof, a poppet-type valve having a head portion cooperating with said valve seat for controlling the flow therethough and a stem portion supported for reciprocation about a valve axis for opening and closing said valve seat, a single cam lobe, a tappet body engaged by and operated by said single cam lobe and reciprocal about an axis parallel to said valve axis, a valve actuator element slidably supported or movement relative to said tappet body in the direction of said valve axis and spaced from engagement with said single cam lobe in all positions of said single cam lobe and engageable with said valve stem for controlling the position of said valve stem, and means for selectively providing a direct mechanical coupling of said tappet body to said valve actuator element for simultaneous movement therewith to control the position of said valve by the position of said tappet body.

2. A valve operating mechanism as defined in claim 1, wherein the selective coupling of the tappet body and the valve actuating element is effective to vary the amount of lift of the poppet-type valve.

3. A valve operating mechanism as defined in claim 1, wherein the valve actuator element has a portion that extends into the tappet body.

4. A valve operating mechanism as defined in claim 1, further including a valve spring for urging the poppet-type valve to a closed position.

5. A valve operating mechanism as defined in claim 4, wherein the valve actuator element is urged by a second spring into engagement with the stem of the poppet valve, and the second spring is loaded between the valve actuator element and the tappet body for loading of the second spring upon movement of the tappet body relative to the valve actuator element.

6. A valve operating mechanism as defined in claim 5, wherein the second spring has a lighter load and rate than the valve spring.

7. A valve operating mechanism as defined in claim 1, wherein the mechanical connection is provided by a plunger element actuated by hydraulic pressure.

8. A valve operating mechanism as defined in claim 7, wherein the hydraulic pressure is derived from a lubricating system for the reciprocating machine.

9. A valve operating mechanism as defined in claim 7, wherein the valve actuator element has a portion that extends into the tappet body.

10. A valve operating mechanism as defined in claim 1, wherein the means for coupling the tappet body to the valve actuating element comprises a plunger member slidably supported by the tappet body from a first position permitting relative movement between the tappet body and the valve actuating element and a second position wherein the sliding plunger member engages the valve actuating element and effects its movement with the tappet body.

11. A valve operating mechanism as defined in claim 10, wherein the sliding plunger member has a bore in which a stem portion of the valve actuator element may reciprocate when the sliding plunger member is in its first position for permitting the tappet body to move relative to the valve actuating element.

12. A valve operating mechanism as defined in claim 11, wherein the plunger member axis extends transversely to the valve axis.

13. A valve operating mechanism as defined in claim 12, wherein the plunger member is actuated by hydraulic pressure.

14. A valve operating mechanism as defined in claim 13, wherein the hydraulic pressure is derived from a lubricating system for the reciprocating machine.

15. A valve operating mechanism as defined in claim 9, further including a valve spring for urging the poppet-type valve to a closed position.

16. A valve operating mechanism as defined in claim 15, wherein the valve actuator element is urged by a second spring into engagement with the stem of the poppet valve, and the second spring is loaded between the valve actuator element and the tappet body for loading of the second spring upon movement of the tappet body relative to the valve actuator element.

17. A valve operating mechanism as defined in claim 16, wherein the second spring has a lighter load and rate than the valve spring.

18. A valve operating mechanism as defined in claim 1, wherein the reciprocating machine comprises an internal combustion engine.

19. A valve operating mechanism as defined in claim 18, wherein the valve seat and flow port are provided in a cylinder head assembly of the engine.

20. A valve operating mechanism as defined in claim 19, wherein the cylinder head assembly comprises a cylinder head element in which the valve seat and flow path are formed and further including a carrier member affixed to the cylinder head element and slidably supporting the tappet body.

21. A valve operating mechanism as defined in claim 20, wherein the cam is associated with a camshaft which is also rotatably journaled by the carrier member.

22. A valve operating mechanism as defined in claim 21, wherein the mechanical connection is provided by a plunger element actuated by hydraulic pressure.

23. A valve operating mechanism as defined in claim 22, wherein the hydraulic fluid for actuating the plunger element is comprised of a flow passage extending through the carrier member.

24. A valve operating mechanism as defined in claim 23, wherein the hydraulic pressure is derived from a lubricating system for the reciprocating machine.

25. A valve operating mechanism as defined in claim 18, wherein there are provided a plurality of valves, each serving the same combustion chamber of the cylinder head and wherein each valve is operated by a tappet body and valve actuator element.

26. A valve operating mechanism as defined in claim 25, wherein the means for selectively coupling the tappet bodies and the actuator elements associated with each of the valves is independently controlled.

27. A valve operating mechanism as defined in claim 2, wherein the flow passages all serve the same function in the combustion chamber.

28. A valve operating mechanism as defined in claim 27, wherein the flow passages are all intake passages.

29. A valve operating mechanism as defined in claim 27, wherein the flow passages are all exhaust passages.

30. A valve operating mechanism as defined in claim 26, wherein there are provided a plurality of intake valves and a plurality of exhaust valves for each cylinder.

31. A valve operating mechanism as defined in claim 30, wherein all of the exhaust valves are operated by cams on an exhaust camshaft and all of the intake valves are operated by cams on an intake camshaft.

32. A valve operating mechanism as defined in claim 31, wherein a first carrier member supports the intake camshaft and the tappet bodies actuated thereby and a second carrier member carries the exhaust camshaft and the tappet bodies actuated thereby.

33. A valve operating mechanism as defined in claim 28, wherein the intake passages and valves are disposed relative to the cylinder so as to provide a different flow effect in the cylinder depending upon which valve is actuated.

34. A valve operating mechanism as defined in claim 33, wherein there are provided three intake valves and three intake passages, each serving a respective intake valve and wherein two of the intake valves comprise side intake valves disposed closer to a plane containing the axis of the cylinder bore, the third intake valve comprises a center intake valve disposed between said side intake valves and spaced from the plane.

35. A valve operating mechanism as defined in claim 34, wherein the two side intake valves reciprocate about axes that lie in a common plane that is disposed at an acute angle to the plane containing the cylinder bore axis, and the center intake valve is supported for reciprocation in a plane that also lies at an acute angle to the plane containing the cylinder bore axis and a different acute angle than that in which the reciprocal axes of the side intake valves lie.

* * * * *

UNITED STATES PATENT AND TRADEMARK OFFICE
CERTIFICATE OF CORRECTION

PATENT NO.   : 5,758,612
DATED        : June 2, 1998
INVENTOR(S)  : Tsuzuku et al.

It is certified that error appears in the above-identified patent and that said Letters Patent is hereby corrected as shown below:

Column 20,
Line 31, please replace "therethough" with -- therethrough --;
Line 36, please replace "supported or" with -- supported for --;

Column 22,
Line 18, please replace "as defined in Claim 2" with -- as defined in Claim 26 --.

Signed and Sealed this

Fifth Day of November, 2002

*Attest:*

*Attesting Officer*

JAMES E. ROGAN
*Director of the United States Patent and Trademark Office*